United States Patent
Keennon et al.

(10) Patent No.: US 8,210,471 B2
(45) Date of Patent: *Jul. 3, 2012

(54) AIR VEHICLE FLIGHT MECHANISM AND CONTROL METHOD

(75) Inventors: Matthew Todd Keennon, Simi Valley, CA (US); Karl Robert Klingebiel, Simi Valley, CA (US); Alexander Andryukov, Simi Valley, CA (US); Bart Dean Hibbs, Simi Valley, CA (US)

(73) Assignee: Aerovironment, Inc., Monrovia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/023,772

(22) Filed: Feb. 9, 2011

(65) Prior Publication Data

US 2012/0048994 A1    Mar. 1, 2012

Related U.S. Application Data

(63) Continuation of application No. PCT/US2010/037540, filed on Jun. 4, 2010.

(60) Provisional application No. 61/184,748, filed on Jun. 5, 2009.

(51) Int. Cl.
*B64C 33/00* (2006.01)

(52) U.S. Cl. ................. 244/22; 244/11; 244/72

(58) Field of Classification Search ........... 244/11, 244/22, 72

See application file for complete search history.

(56) References Cited

U.S. PATENT DOCUMENTS

| | | | |
|---|---|---|---|
| 2,584,663 | A | 2/1952 | Bensen |
| 2,976,739 | A | 3/1961 | Lewellen et al. |
| 3,132,620 | A | 5/1964 | Court |
| 3,508,840 | A | 4/1970 | Lederlin |
| 5,938,150 | A | 8/1999 | King |
| 6,540,177 | B2 | 4/2003 | Woo et al. |
| 7,007,889 | B2 | 3/2006 | Charron |
| 7,195,199 | B2 | 3/2007 | Ohta et al. |
| 7,350,745 | B2 | 4/2008 | Livingston |
| 2004/0195436 | A1 | 10/2004 | Sinclair |
| 2005/0230522 | A1 | 10/2005 | Smith |
| 2007/0210207 | A1 | 9/2007 | Liao |
| 2007/0262194 | A1 | 11/2007 | Agrawal et al. |
| 2008/0191100 | A1 | 8/2008 | Muren |
| 2008/0251632 | A1 | 10/2008 | Kim et al. |

FOREIGN PATENT DOCUMENTS

WO    WO-2004/112929 A1    12/2004

OTHER PUBLICATIONS

McIntosh, Agarwal, & Khan, "Design of a Mechanism for Biaxial Rotation of a Wing for a Hovering Vehicle," Apr. 2006, vol. 11, No. 2, IEEE/AMSE Transactions on Mechatronics.
Non-Final Office Action for U.S. Appl. No. 12/795,539 mailed Nov. 9, 2011.
International Search Report for Serial No. PCT/US2010/037540 mailed Aug. 11, 2010.

*Primary Examiner* — Michael Carone
*Assistant Examiner* — Jamie S Stehle
(74) *Attorney, Agent, or Firm* — Michael Blaine Brooks, PC; Michael B. Brooks; Eric Aagaard

(57) ABSTRACT

Heavier-than-air, aircraft having flapping wings, e.g., ornithopters, where angular orientation control is effected by variable differential sweep angles of deflection of the flappable wings in the course of sweep angles of travel and/or the control of variable wing membrane tension.

6 Claims, 43 Drawing Sheets

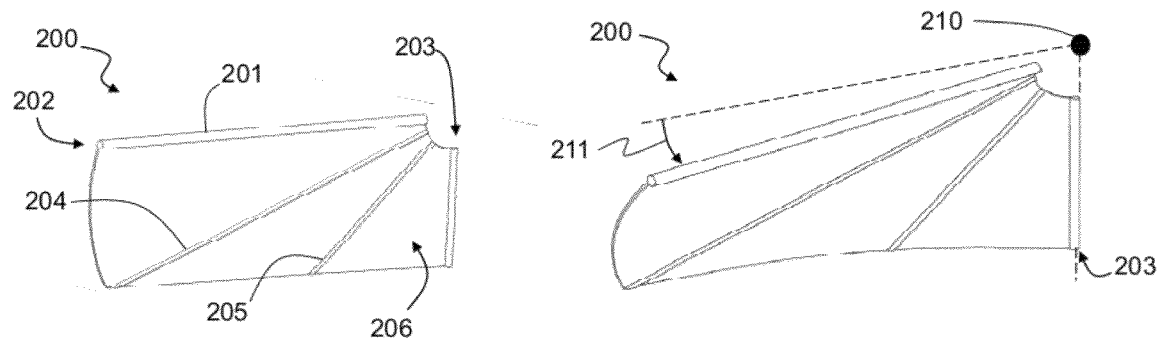
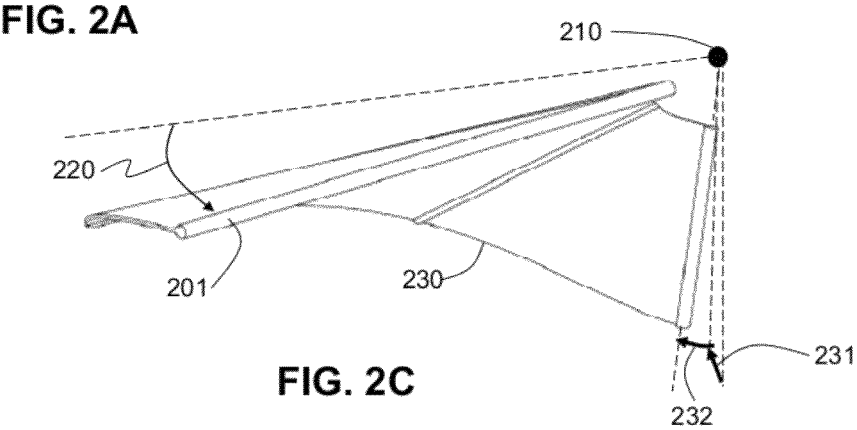
FIG. 2A
FIG. 2B
FIG. 2C

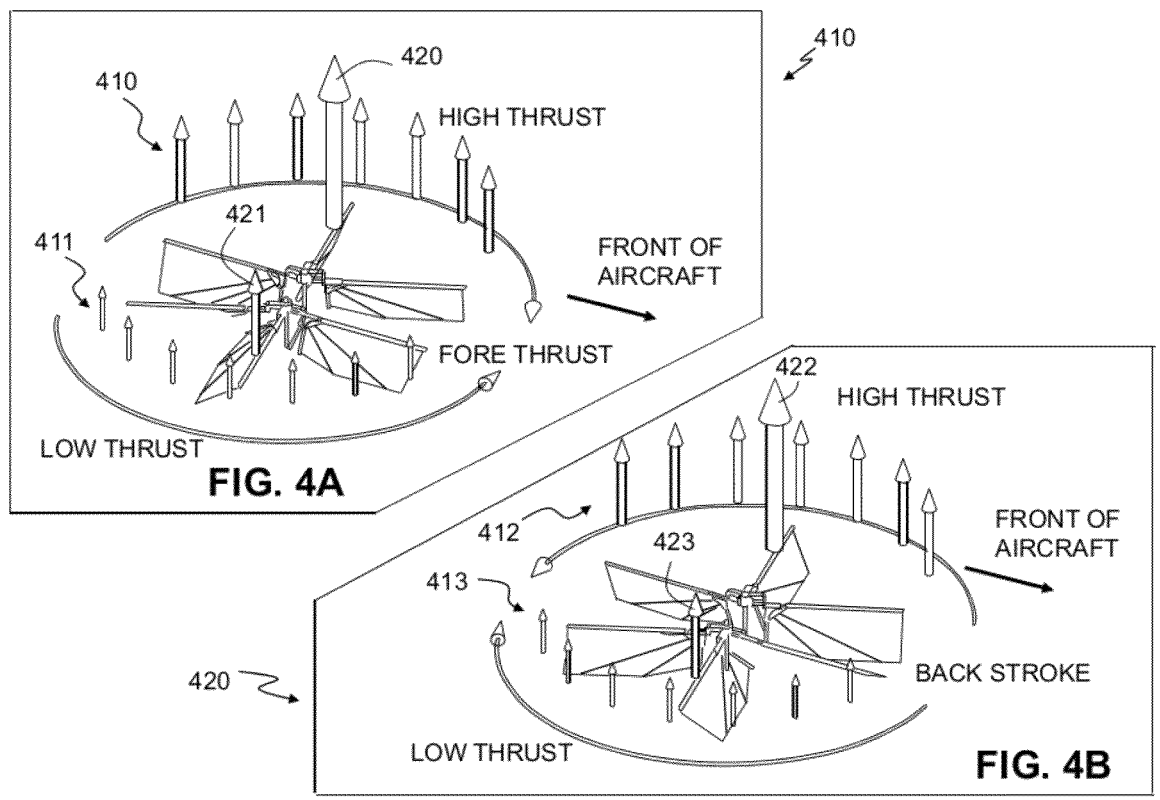

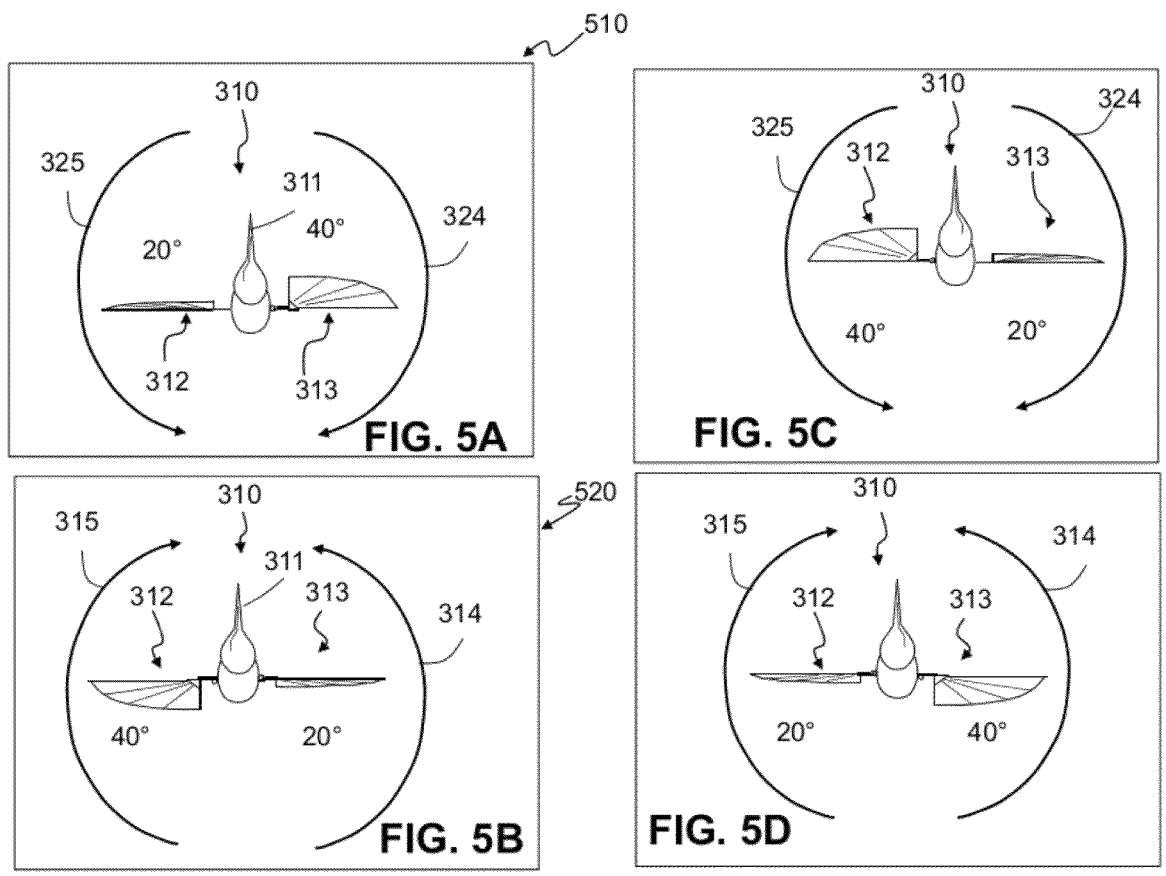

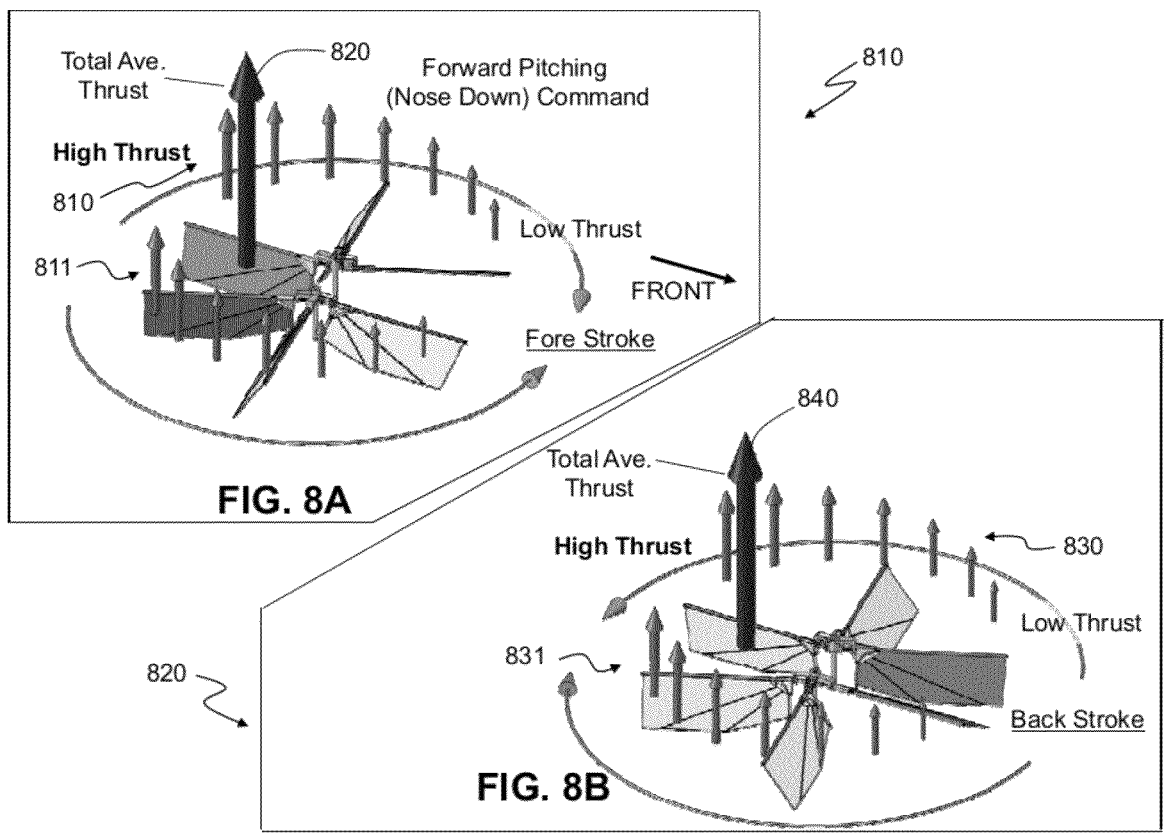

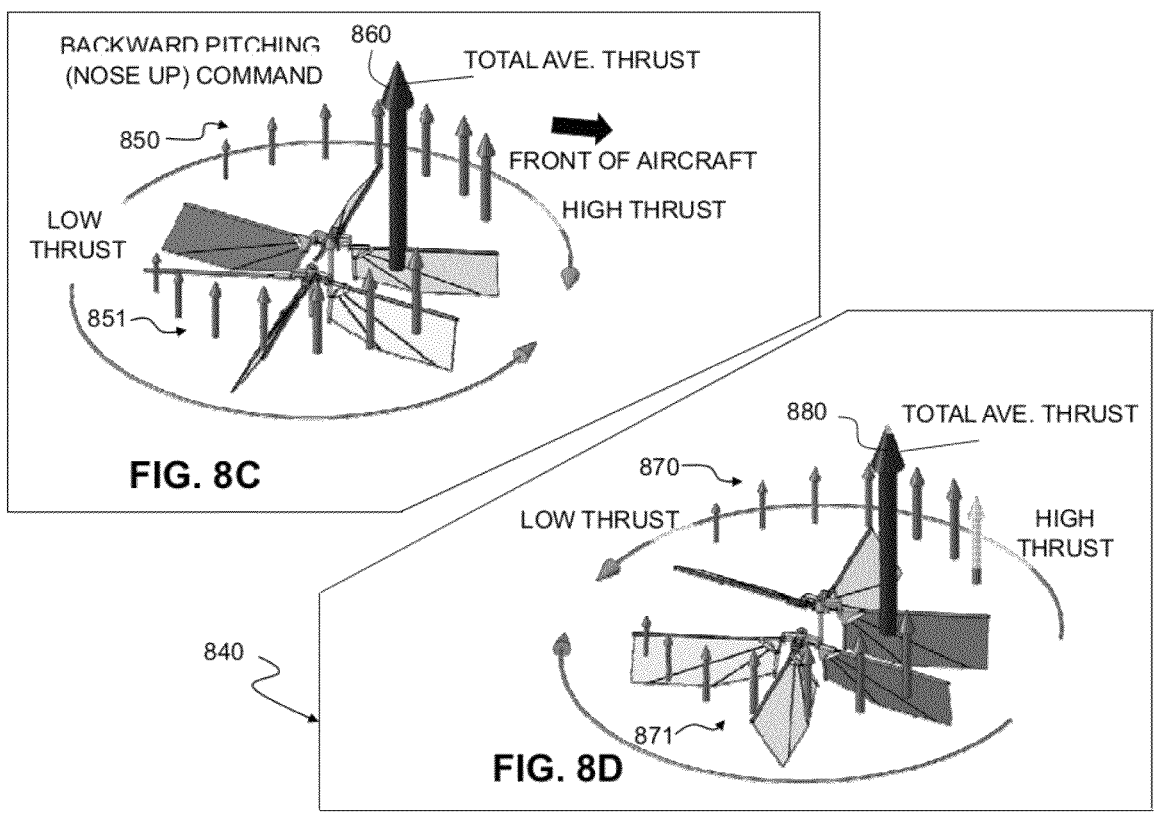

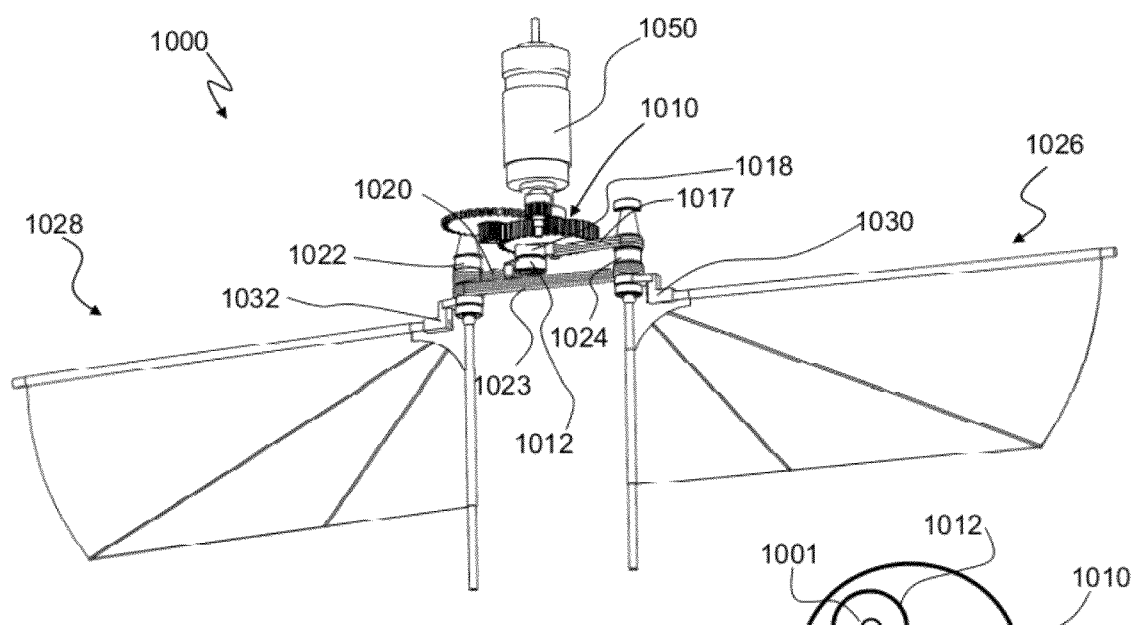
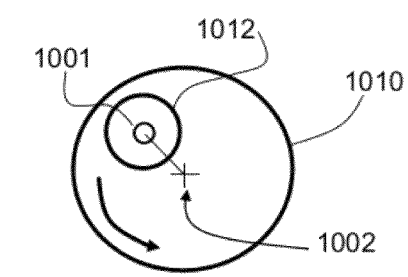
FIG. 10B
FIG. 10A

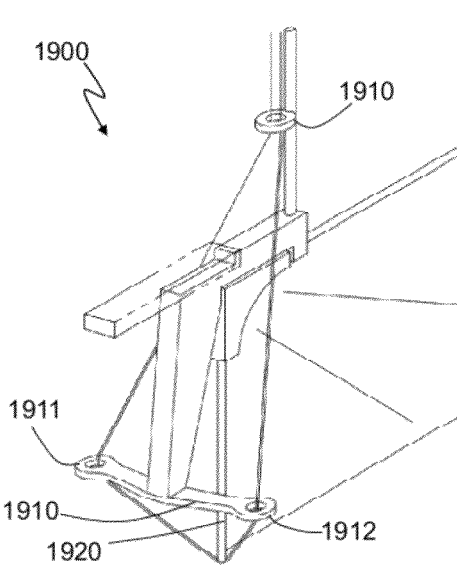
FIG. 19
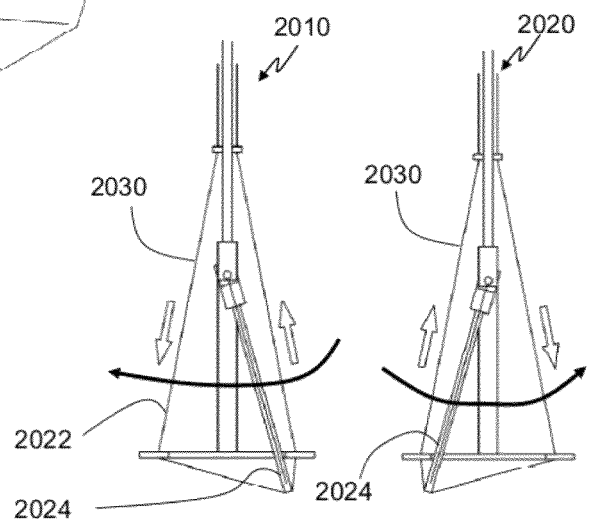
FIG. 20A    FIG. 20B

AIR VEHICLE FLIGHT MECHANISM AND CONTROL METHOD

CROSS-REFERENCE TO RELATED APPLICATIONS

This application is a continuation of International Application No. PCT/US2010/037540 filed Jun. 4, 2010, which claims priority to and benefit of U.S. Provisional Patent Application No. 61/184,748, filed Jun. 5, 2009, which are hereby incorporated herein by reference in their entirety for all purposes.

STATEMENT REGARDING FEDERALLY SPONSORED RESEARCH OR DEVELOPMENT

This invention was made with Government support under contract no. W31P4Q-06-C-0435 awarded by the US Army Aviation and Missile Command. The US Government has certain rights in the invention.

TECHNICAL FIELD

Heavier-than-air, aircraft having flapping wings where angular orientation control is effected by variable differential sweep angles of deflection of the flappable wings in the course of sweep angles of travel and/or the control of variable wing membrane tension.

BACKGROUND

Radio-controlled, heavier-than-air, aircraft having sustainable beating wings, e.g., ornithopters.

SUMMARY

Exemplary embodiments of an air vehicle comprise a support structure, e.g., a structural element of a fuselage, where the support structure may further comprise a flapping drive element, e.g., one or more motors configured to generate flapping angular velocity, a first airfoil rotatably attached, e.g., via a joint, to the support structure and a second airfoil rotatably attached, e.g., via a joint, to the support structure. The first airfoil may comprise a root-to-wingtip spar, or mast, a root spar, or boom, and a scrim, or membrane, attached to, e.g., wrapped about or wrapped about a tube that is disposed about, the first mast and the first root spar. The first airfoil is configured to be driven to flap via the flapping drive element, e.g., via gearing, pulleys, and/or linkages. The second air foil comprises a second mast, second root spar, and a second membrane attached to the second root spar and the second mast. The second airfoil is also configured to be driven to flap via the flapping drive element. Air vehicle control about at least one axis of the vehicle, e.g., pitch, yaw, or roll, is effected by at least one of: (a) variable membrane luffing, e.g., via increasing and decreasing the angle between the mast and the root spar by the rotating the root spar relative to the mast thereby loosening or making taut the surface of the membrane; (b) variable root spar rotation travel limitation, e.g., via repositionable boom tip travel stops, and (c) variable motor drive speed, e.g., via a flapping drive element comprising two motors, each driving one airfoil.

Exemplary embodiments include an air vehicle control device comprising: a first flappable wing having a sweep angle of travel, wherein the first flappable wing comprises a membrane attached to a root spar and a mast, the membrane having surface tension adjustable via rotation of the root spar relative to the mast; a second flappable wing having a sweep angle of travel, wherein the second flappable wing comprises a second membrane attached to a second root spar and a second mast, the membrane having surface tension adjustable via rotation of the second root spar relative to the second mast; wherein the first flappable wing extends in a radial direction from the air vehicle and the second flappable wing extends in a radial direction from a side of the air vehicle substantially opposite the first flappable wing; and thereby configured to generate at least one of: a pitching torque, a rolling torque and a yawing torque, by generating a difference between luffing of the first flappable wing and luffing of the second flappable wing. Other exemplary embodiments have the first flappable wing further comprising a sweep angle of deflection comprising a forward sweep angle of deflection and a backward sweep angle of deflection; and a second flappable wing further comprising a sweep angle of deflection comprising a forward sweep angle of deflection and a backward sweep angle of deflection; where the device is further configured to generate a yawing torque, by generating at least one of: a difference between the forward sweep angle of deflection of the first flappable wing and the forward sweep angle of deflection of the second flappable wing, and a difference between the backward sweep angle of deflection of the first flappable wing and the backward sweep angle of deflection of the second flappable wing.

Exemplary embodiments include an assembly comprising: (a) a first arm rotatably attached to a support structure and a second arm rotatably attached to the support structure; (b) a first wing comprising a membrane attached to a first mast and a first root spar, the first wing mast rotationally attached to a first arm, and the first root spar attached to a luffing control assembly; and (c) a second wing comprising a membrane attached to a second mast and a second root spar, the second wing mast rotationally attached to a second arm, and the second root spar attached to the luffing control assembly. The luffing control assembly may comprise a first yang attached to the first root spar while allowing for some rotational travel of the first root spar about the mast longitudinal axis, a second yang attached to the second root spar while allowing for some rotational travel of the second root spar about the mast longitudinal axis, and a repositionable yang yoke configured to receive the first yang and the second yang. Other exemplary embodiments include the first arm further comprising a first repositionable stop and a second repositionable stop together defining a rotation angle of the first wing root spar about the first wing mast; and the second arm further comprising a third repositionable stop and a fourth repositionable stop together defining a rotation angle of the second wing rootspar about the second wing mast.

Embodiments also include a method of air vehicle control comprising (in no particular order): (a) providing: (i) a first flappable wing having a sweep angle of travel, and having a sweep angle of deflection comprising a forward sweep angle of deflection and a backward sweep angle of deflection; and (ii) a second flappable wing having a sweep angle of travel, and having a sweep angle of deflection comprising a forward sweep angle of deflection and a backward sweep angle of deflection; wherein the first flappable wing extends in a radial direction from the air vehicle and the second flappable wing extends in a radial direction from a side of the air vehicle substantially opposite the first flappable wing; and (b) generating at least one of: a rolling torque and a yawing torque, by generating at least one of: a difference between the forward sweep angle of deflection of the first flappable wing and the forward sweep angle of deflection of the second flappable wing, and a difference between the backward sweep angle of deflection of the first flappable wing and the backward sweep angle of deflection of the second flappable wing. The method of air vehicle control may further comprise generating a pitching torque by changing the forward angle of deflection of the first flappable wing based on its sweep angle and by changing the forward angle of deflection of the second flappable wing based on its sweep angle. Some embodiments of the invention may further comprise generating a pitching torque by changing the backward angle of deflection of the first flappable wing based on its sweep angle and by changing the backward angle of deflection of the second flappable wing based on its sweep angle.

Embodiments may also include a flapping device comprising: (a) a rotating element having a center of rotation and a plane of rotation; (b) a first capstan mounted about a shaft, the shaft attached to the rotating element distal from the center of rotation and substantially perpendicular to the plane of rotation; (c) a first rocker member rotatably attached to a support structure; (d) a first drive link rotatably attached to the first capstan and the first rocker member; (e) a first arm rotatably attached to the support structure and rotatably attached to the first rocker member via a first rocker link; (f) a second capstan mounted about the shaft; (g) a second rocker member rotatably attached to the support structure; (h) a second drive link rotatably attached to the second capstan and the second rocker member; and (i) a second arm rotatably attached to the support structure and rotatably attached to the second rocker member via a second rocker link. Some embodiments of the mechanism embodiment have the rotating element rotatably attached to the support structure.

Embodiments may also include an assembly comprising: (a) a first arm rotatably attached to a support structure and a second arm rotatably attached to the support structure; (b) a first wing comprising a first mast and a first spar, the first wing mast rotationally attached to a first arm, the first arm having a first repositionable stop and a second repositionable stop together defining a rotation angle of the first wing spar about the first wing mast; and (c) a second wing comprising a second mast and a second spar, the second wing mast rotationally attached to a second arm, the second arm having a third repositionable stop and a fourth repositionable stop together defining a rotation angle of the second wing spar about the second wing mast. Some embodiments of the assembly have the first stop disposed on a first pulley and the second stop disposed on a second pulley, where the first pulley and the second pulley are each rotatably repositionable via an actuated linking member and where the third stop and fourth stop are each rotatably repositionable via a second actuated linking member.

Some embodiments of the assembly have the first stop disposed on a first pulley and the second stop disposed on a second pulley, where the first pulley and the second pulley are each rotatably repositionable via an actuated linking member to increase a first angle subtended by the first stop and the second stop, and the third stop and fourth stop are each rotatably repositionable via a second actuated linking member to increase a second angle subtended by the third stop and the fourth stop.

Embodiments may also include a mechanism comprising: (a) a rotating element having a center of rotation and a plane of rotation; (b) a first capstan mounted about a shaft, the shaft attached to the rotating element distal from the center of rotation and substantially perpendicular to the plane of rotation; (c) a second capstan mounted about the shaft; (d) a first arm mounted to a third capstan, a first linking member connecting the third capstan with the first capstan; (e) a second arm mounted to a fourth capstan, a second linking member connecting the fourth capstan with the second capstan; and (f) a third linking member connecting the third capstan with the fourth capstan. In some embodiments of the mechanism, the third capstan of the mechanism may have a center of rotation, the fourth capstan may have a center of rotation, and the center of rotation of the rotating element may be substantially collinear with both the center of rotation of the third capstan and the center of rotation of the fourth capstan. In some embodiments of the mechanism, the first linking member may comprise a cord, the second linking member may comprise a cord, and the third linking member may comprise a cord.

Embodiments may also include a wing comprising: (a) a mast engaging a fitment; (b) a spar engaging a fitment substantially perpendicular to the mast; (c) a mast tube disposed about a portion of the mast; (d) a spar tube disposed about a portion of the spar; (e) a scrim attached to the spar tube and the mast tube; and (f) a first batten disposed on the scrim and extending in a direction radially from the intersection of the spar and the mast, the first batten having a distal end proximate to an edge of the airfoil. Some embodiments of the wing further comprise a strut disposed proximate to the intersection of the mast and the spar, the strut attached to the mast and the spar. Some embodiments of the wing have the first batten further comprising a proximal end attached to the strut. Some embodiments of the wing may further comprise a second batten disposed on the scrim and extending in a direction radially from the intersection of the spar and the mast, the second batten having a distal end proximate to an edge of the airfoil. Some embodiments of the wing have the second batten further comprising a proximal end attached to the strut. Still other embodiments of the wing further comprise a root socket configured to fixedly receive the spar and configured to rotatably receive the mast. In some embodiments, the planform of the wing is defined by perimeter points comprising: the distal end of the first batten, a distal end portion of the mast, a distal end portion of the spar, a proximal end portion of the mast, and a proximal end portion of the spar. In some embodiments, the planform of the wing is defined by perimeter points comprising: the distal end of the first batten, the distal end of the second batten, a distal end portion of the mast, a distal end portion of the spar, a proximal end portion of the mast, and a proximal end portion of the spar. Some embodiments of the wing have a scrim comprising a polyvinyl fluoride film and some other embodiments of the wing have a scrim comprising a polyvinyl fluoride film further comprising a fiber mesh. For some embodiments of the wing, the scrim comprises a fiber mesh comprising intersecting lines of fiber mesh, the lines of fiber mesh may be oriented at oblique angles relative to the spar tube and relative to the mast tube. Some embodiments of the wing have the mast comprising a carbon rod and the first batten may comprise a carbon rod.

A flapping drive element may comprise two or more motors, flap rate sensors, and circuitry to control and adjust the flap rates of the two airfoils, each attached to an arm of the flapping drive element. For example, a flapping drive element may comprise a first motor driving a first rotating element, the first rotating element having a center of rotation and a plane of rotation; a first capstan mounted about a shaft, the shaft attached to the rotating element distal from the center of rotation and substantially perpendicular to the plane of rotation; a second capstan mounted about the shaft; a first arm mounted to a third capstan, a first linking member connecting the third capstan with the first capstan; a second linking member connecting the fourth capstan with the second capstan; and a third linking member connecting the third capstan with the fourth capstan; a second motor driving a second rotating element, the second rotating element having a center of rotation and a plane of rotation; a fifth capstan mounted about a second shaft, the second shaft attached to the second rotating element distal from the center of rotation and substantially perpendicular to the plane of rotation of the second rotating element; a sixth capstan mounted about the second shaft; a fourth linking member connecting the seventh capstan with the fifth capstan; a second arm mounted to a eighth capstan, a fifth linking member connecting the eighth capstan with the sixth capstan; and a sixth linking member connecting the seventh capstan with the eighth capstan; and circuitry controlling a flapping rate of the first motor and the second motor.

BRIEF DESCRIPTION OF THE DRAWINGS

Embodiments of the invention are illustrated by way of example and not limitation in the figures of the accompanying drawings, and in which:

FIG. 2A depicts an exemplary airfoil;

FIG. 2B depicts the flexibility and luffing of the exemplary airfoil of FIG. 2A;

FIG. 2C depicts the flexibility and luffing of the exemplary airfoil of FIG. 2A.

FIG. 4A depicts instantaneous thrust vectors and cumulative thrust vectors for the left and right sides of a vehicle such as in FIGS. 3A and 3B;

FIG. 4B depicts instantaneous thrust vectors and cumulative thrust vectors for the left and right sides of a vehicle such as in FIGS. 3A and 3B;

FIG. 5A depicts in a top view an aircraft having a nose tip oriented in the forward direction with its left airfoil deflected less than its right airfoil in a backward stroke of the wings;

FIG. 5B depicts in a top view an aircraft having a nose tip oriented in the forward direction with its left airfoil deflected more than its right airfoil in a forward stroke of the wings;

FIG. 5C depicts in a top view an aircraft having a nose tip oriented in the forward direction with its left airfoil deflected more than its right airfoil in a backward stroke of the wings;

FIG. 5D depicts in a top view an aircraft having a nose tip oriented in the forward direction with its left airfoil deflected less than its right airfoil in a forward stroke of the wings;

FIG. 8A depicts instantaneous thrust vectors and cumulative thrust vectors for the left and right sides of a vehicle such as in FIGS. 7A and 7B;

FIG. 8B depicts instantaneous thrust vectors and cumulative thrust vectors for the left and right sides of a vehicle such as in FIGS. 7A and 7B;

FIG. 8C depicts instantaneous thrust vectors and cumulative thrust vectors for the left and right sides of a vehicle such as in FIGS. 7C and 7D;

FIG. 8D depicts instantaneous thrust vectors and cumulative thrust vectors for the left and right sides of a vehicle such as in FIGS. 7C and 7D;

FIG. 10A depicts a portion of the drive assembly of FIG. 10B;

FIG. 10B depicts an exemplary flapping drive assembly and mechanism;

FIG. 19 depicts an alternate means of boom travel control where a cord or string is controlled by a servo and fed, via eyelets, to the boom and fixed at a distal portion of the boom;

FIG. 20A depicts control of the orientation of the boom during flapping may be effected by rotating the cord or string to position the boom for a backward stoke;

FIG. 20B depicts control of the orientation of the boom during flapping may be effected by rotating the cord or string to position the boom for a backward stoke;

DETAILED DESCRIPTION

Embodiments of the present invention include radio-controlled, heavier-than-air, aircraft having flapping wings, e.g., ornithopters, where the vehicle orientation control is effected by variable differential sweep angles of deflection of the flappable wings in the course of sweep angles of travel, variable differential luffing of the wings, and/or variable and differential angular velocity of wing flapping. Embodiments of the air vehicle comprise two wings, or airfoils, having the principal functions of providing lift and generating control moments or torques about the air vehicle. Either of two such airfoils may be disposed on each side of the fuselage, or structural body, of the air vehicle. Each wing comprises a root-to-wingtip spar, or mast, having a proximal end proximate to the wing root, and a distal end proximate to the wingtip. Each wing comprises a root spar, or boom, proximate to the proximal end of the mast, and the boom may be oriented, fixedly rotationally, but otherwise substantially orthogonal to the mast. A lifting surface membrane element for each wing is attached to the respective mast and the boom, and the membrane and boom may rotate or pivot about the longitudinal axis of the mast. The wings may be driven by an onboard flapping drive element, e.g., at least one motor and mechanical movement so as to be flapped and their wingtips circumscribe arcs about the longitudinal axis of the air vehicle. If the boom is free to travel some angular amount about the mast, then the distal end of the boom and the trailing edge of the lifting surface tend to trail the motion of the mast and leading portion of the lifting surface during flapping strokes. The distal end of the boom may be variably restrained relative to the mast, thereby variably limiting the angular travel of the boom about the mast and/or varying the wing membrane slack, or luffing of the membrane. A thrust force may be generated via the airfoils, each airfoil's thrust having an instantaneous magnitude depending on the direction of mast flapping, i.e., a forward stroke or an backward stroke, the angle of each boom relative to its respective mast and/or the amount of luffing in the wing membrane and/or the angular velocity of the wing during the stroke.

Figure 1:
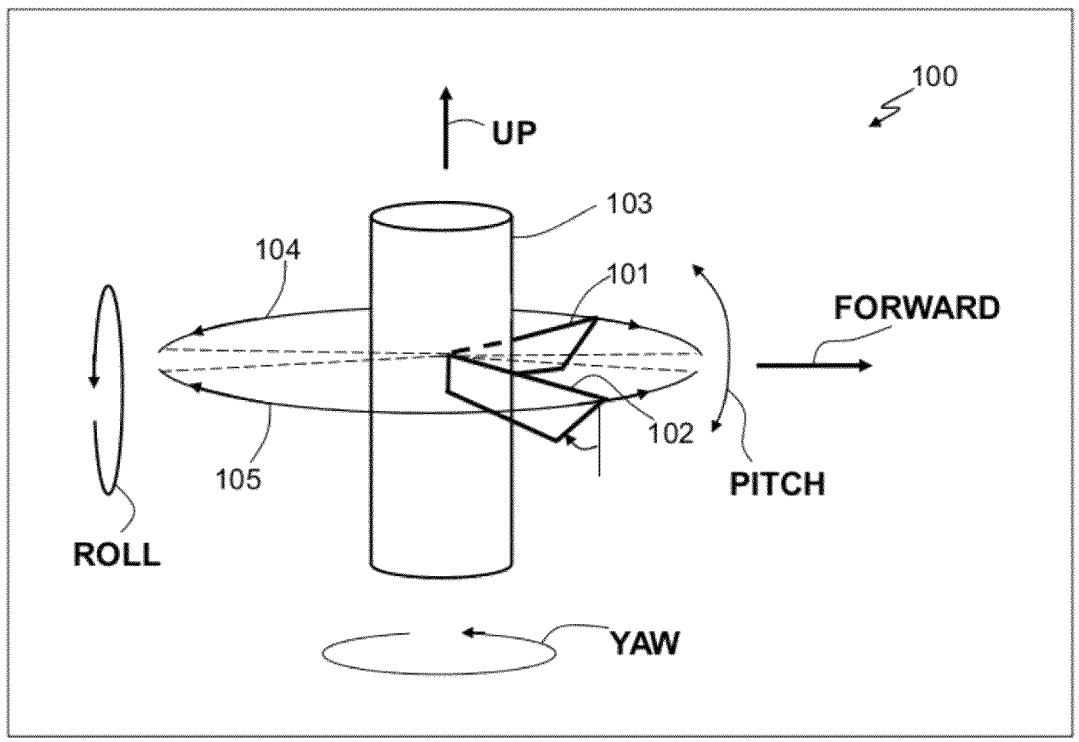
FIG. 1 depicts an aircraft having two flapping airfoils.

FIG. 1 depicts an aircraft 100 having two airfoils 101, 102 a left (port) airfoil 101 and a right (starboard) airfoil 102, each attached to the aircraft structure 103, such as the fuselage, and where the flapping in the forward direction of the aircraft, where the wingtips of the airfoils generally circumscribe arcs 104, 105 in the horizontal plane about the aircraft 100 and, their respective extents of travel each define a sweep angle of travel.

FIG. 2A depicts an exemplary airfoil 200 having a leading portion 201 comprising a sleeve 202 for receiving a mast tube element and a sleeve 203 for receiving a boom tube element. The airfoil as depicted includes two stiffening elements, i.e., battens 204, 205, disposed on a surface membrane of the airfoil 200. FIG. 2B depicts the flexibility of the exemplary airfoil of FIG. 2A where the leading portion swings about a pivot point 210, and in a plane orthogonal to the root spar sleeve 203, to circumscribe a flapping angle 211. FIG. 2C depicts the flexibility of the exemplary airfoil of FIG. 2B where the leading portion 201 is further swung about a pivot point and the distal end of the boom establishes a sweep angle of deflection 220. The trailing edge 221 and distal portion of the root spar, or boom, tends to trail the leading portion 201, and if boom travel is permitted but limited, the distal end of the boom and the boom sleeve 203 will trail by a sweep angle of deflection 231. Generally, the larger the sweep angle of deflection, the lower the thrust generated by the airfoil. If the boom is permitted to decrease its angle relative to the mast 232, then the airfoil membrane will experience increased luffing. Generally, the greater the luffing, the lower the thrust generated by the airfoil.

Figure 3A:
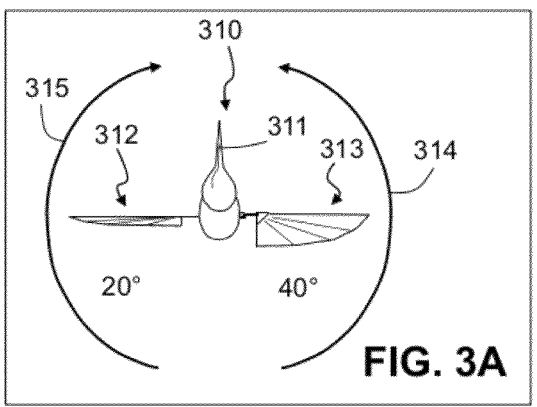
FIG. 3A depicts in a top view an aircraft having a nose tip oriented in the forward direction with its left airfoil deflected less than its right airfoil in a forward stroke of the wings.
Figure 3C:
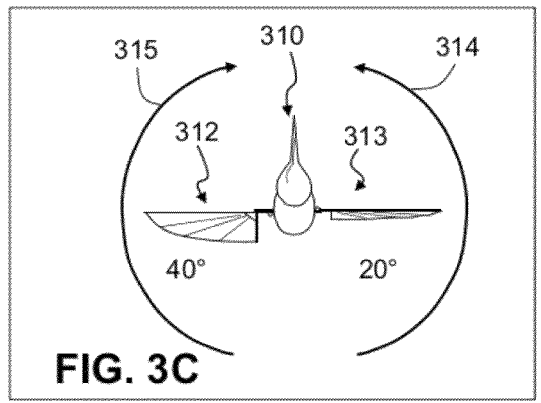
FIG. 3C depicts in a top view an aircraft having a nose tip oriented in the forward direction with its left airfoil deflected more than its right airfoil in a forward stroke of the wings.
Figure 3B:
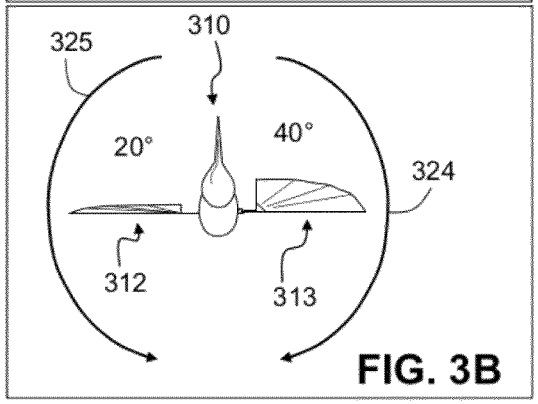
FIG. 3B depicts in a top view an aircraft having a nose tip oriented in the forward direction with its left airfoil deflected less than its right airfoil in a backward stroke of the wings.
Figure 3D:
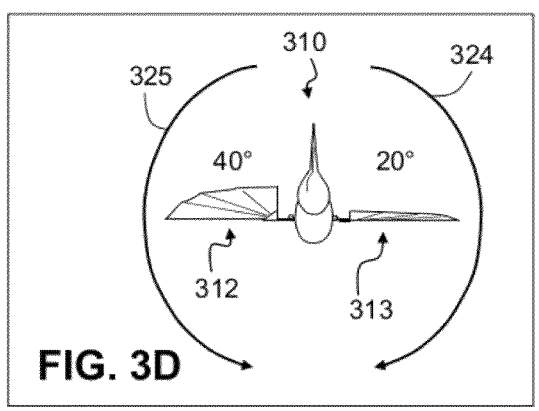
FIG. 3D depicts in a top view an aircraft having a nose tip oriented in the forward direction with its left airfoil deflected less than its right airfoil in a backward stroke of the wings.

FIG. 3A depicts in a top view an aircraft 310 having a nose tip 311 oriented in the forward direction with its left airfoil 312 deflected, e.g., 20 degrees, an angle less than its right airfoil 313, e.g., 40 degrees, in a forward stroke 314, 315 of each of the wings 312, 313. Accordingly, the left wing generates more thrust upward than the right wing. FIG. 3B depicts in a top view the aircraft 310 having a nose tip oriented in the forward direction with its left airfoil 312 deflected, e.g., 20 degrees, an angle less than its right airfoil 313, e.g., 40 degrees in a backward stroke 324, 325 of the wings 312, 313. Accordingly, this generates a roll moment about (over the top of) the vehicle 310. FIG. 3C depicts in a top view of the aircraft 310 having a nose tip oriented in the forward direction with its left airfoil 312 deflected, e.g., 40 degrees, and angle more than its right airfoil 313, e.g., 20 degrees in a forward stroke 314, 315 of the wings 312, 313. Accordingly, the right wing 313 generates more thrust upward than the left wing 312. FIG. 3D depicts in a top view the aircraft 310 having a nose tip oriented in the forward direction with its left airfoil 312 deflected, e.g., 40 degrees, an angle more than its right airfoil 313, e.g., 20 degrees in a backward stroke 324, 325 of the wings 312, 313. Accordingly, this generates a roll moment about the vehicle 310 in the angular direction opposite that of FIG. 3B.

Figure 4C:
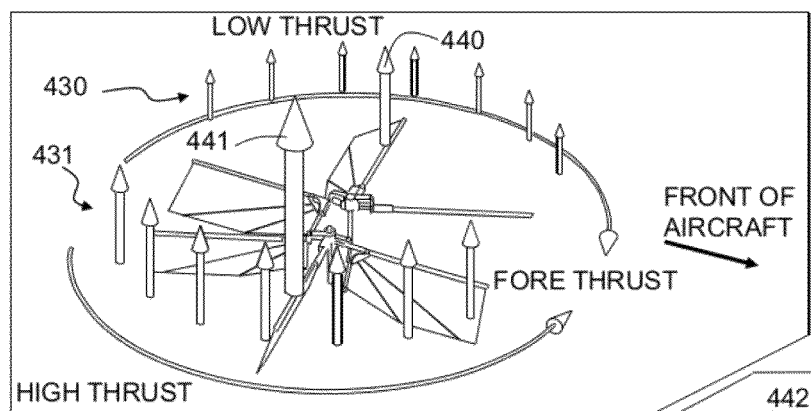
FIG. 4C depicts instantaneous thrust vectors and cumulative thrust vectors for the left and right sides of a vehicle such as in FIGS. 3C and 3D.
Figure 4D:
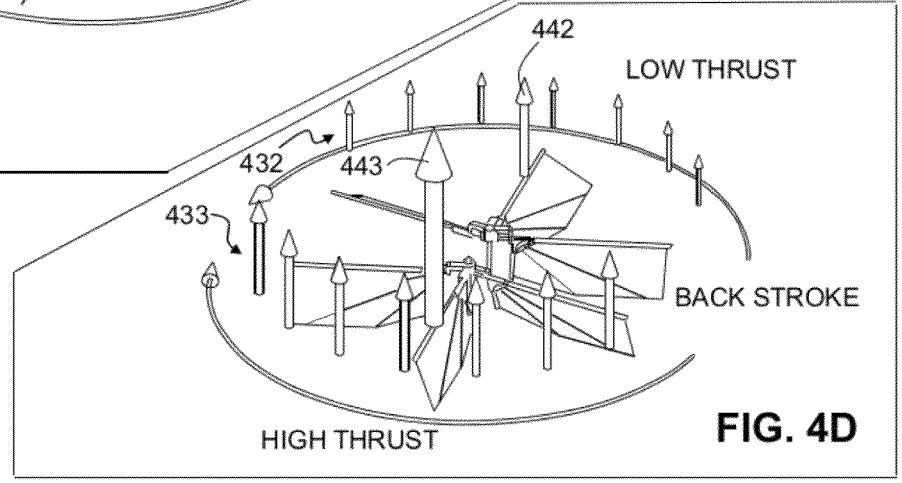
FIG. 4D depicts instantaneous thrust vectors and cumulative thrust vectors for the left and right sides of a vehicle such as in FIGS. 3C and 3D.

FIGS. 4A and 4B depict idealized instantaneous thrust vectors 410-413 and idealized average cumulative thrust vectors 420-422 for the left and right sides of a vehicle, such as in FIGS. 3A and 3B. Exemplary wing deflections are depicted for each wing at three positions in a stroke. Accordingly, the vehicle generates roll moment to effect a right roll, according to the right hand rule. FIGS. 4C and 4D depict idealized instantaneous thrust vectors 430-433 and idealized average cumulative thrust vectors 430-441 for the left and right sides of a vehicle such as in FIGS. 3C and 3D. Again, exemplary wing deflections are depicted for each wing at three positions in a stroke. Accordingly, the vehicle generates roll moment to effect a left roll, according to the right hand rule.

FIG. 5A depicts in a top view an aircraft 310 having a nose tip oriented in the forward direction with its left airfoil 325 deflected, e.g., 20 degrees, an angle less than its right airfoil 313, e.g., 40 degrees in a backward stroke 324, 325 of the wings 312, 313. Accordingly, the left wing 312 generates more thrust upward than the right wing 313. FIG. 5B depicts in a top view the aircraft 310 having a nose tip oriented in the forward direction with its left airfoil 312 deflected, e.g., 40 degrees, an angle more than its right airfoil 324, e.g., 20 degrees in a forward stroke 314, 315 of the wings 312, 313. Accordingly, this arrangement generates a yaw moment counterclockwise about the vehicle 310, i.e., a left yawing motion. FIG. 5C depicts in a top view the aircraft 310 having a nose tip oriented in the forward direction with its left airfoil 312 deflected, e.g., 40 degrees, an angle more than its right airfoil 313, e.g., 20 degrees in a backward stroke 324, 325 of the wings 312, 313. Accordingly, the right wing 313 generates more thrust upward than the left wing 312. FIG. 5D depicts in a top view the aircraft having a nose tip oriented in the forward direction with its left airfoil 312 deflected, e.g., 20 degrees, an angle less than its right airfoil 313, e.g., 40 degrees in a forward stroke 314, 315 of the wings 312, 313. Accordingly, this generates a yaw moment about the vehicle 310 in the angular direction opposite that of FIG. 5B, i.e., a right yawing moment.

Figure 6A:
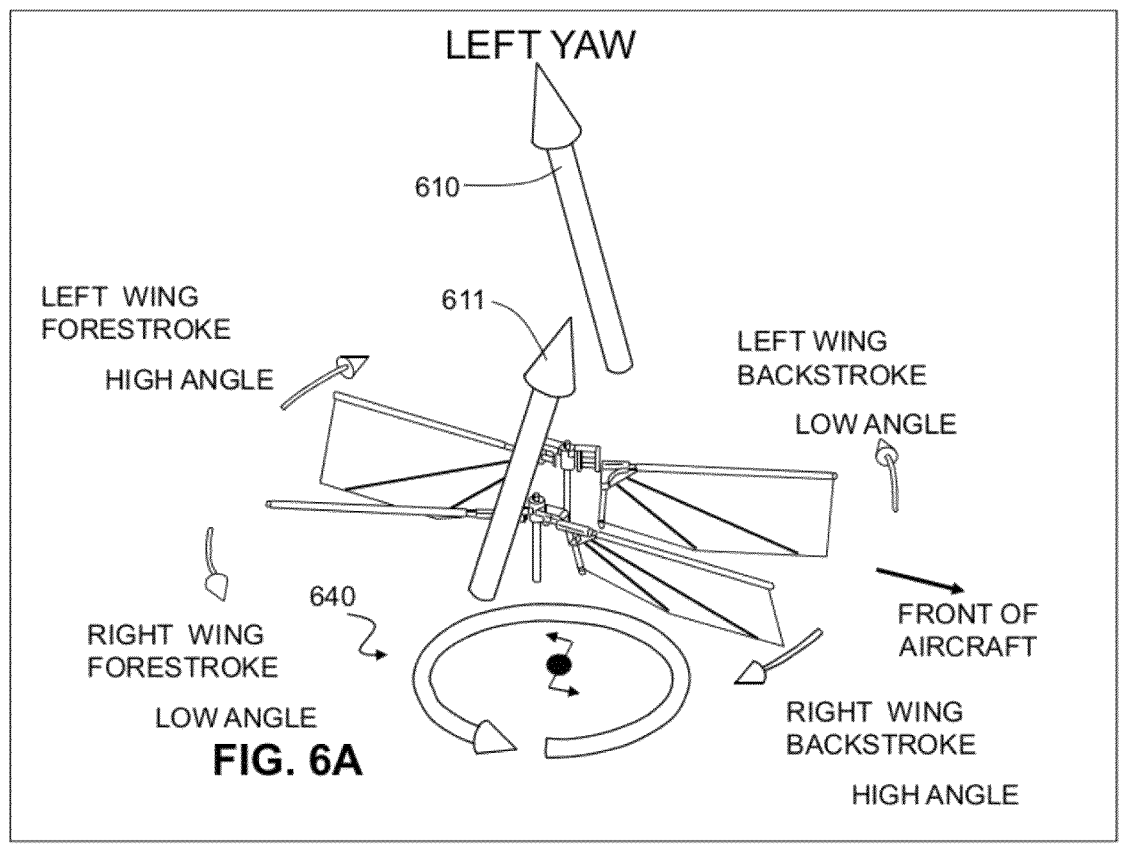
FIG. 6A depicts instantaneous thrust vectors and cumulative thrust vectors for the left and right sides of a vehicle such as in FIGS. 5A and 5B.
Figure 6B:
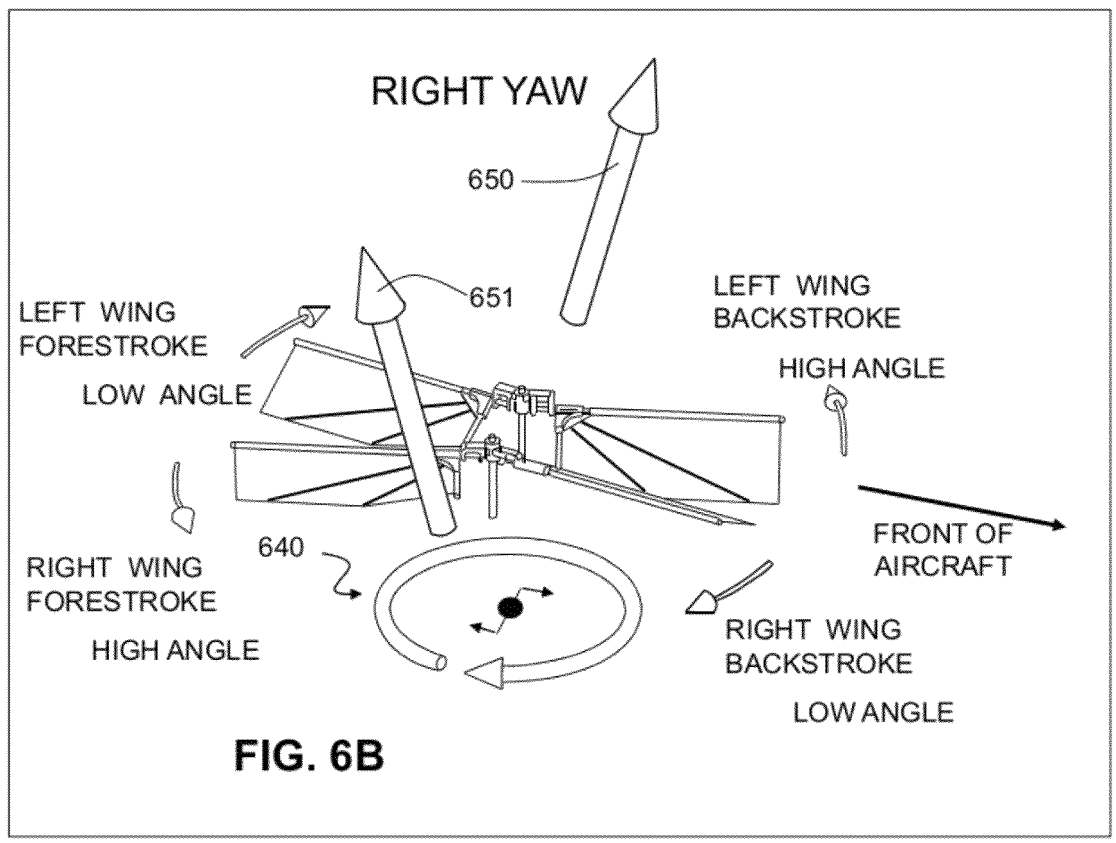
FIG. 6B depicts instantaneous thrust vectors and cumulative thrust vectors for the left and right sides of a vehicle such as in FIGS. 5C and 5D.

FIG. 6A depicts idealized average cumulative thrust vectors 610-611 for the left and right sides of a vehicle, such as in FIGS. 5A and 5B, where the left wing fore stroke has the left wing in a high angle of deflection, the left wing back stroke has the left wing in a low angle of deflection, while the right wing fore stroke has the right wing in a low angle of deflection and the right wing backstroke has the right wing in a high angle of deflection. Exemplary wing deflections are depicted for each wing at two positions in a stroke. Accordingly, in the plane of yaw rotation 640, the horizontal components of the thrust vectors are projected—indicating the vehicle generates yaw moment to effect a counterclockwise or left yaw maneuver. FIG. 6B depicts idealized average cumulative thrust vectors 650-651 for the left and right sides of a vehicle, such as in FIGS. 5C and 5D, where the left wing fore stroke has the left wing in a low angle of deflection, the left wing back stroke has the left wing in a high angle of deflection, while the right wing fore stroke has the right wing in a high angle of deflection and the right wing backstroke has the right wing in a low angle of deflection. Exemplary wing deflections are depicted for each wing at two positions in a stroke. Accordingly, in the plane of yaw rotation 640, the horizontal components of the thrust vectors are projected—indicating the vehicle generates yaw moment to effect a clockwise or right yaw maneuver.

Figure 7A:
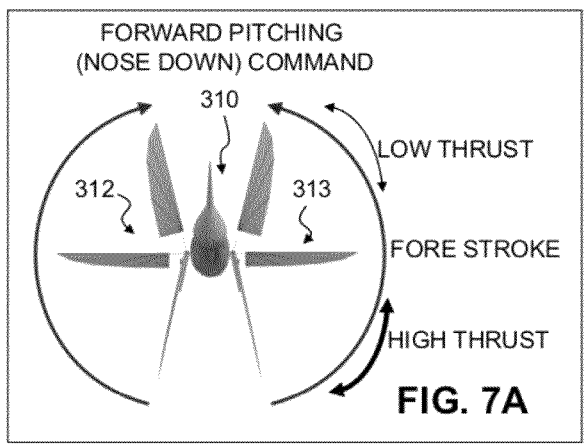
FIG. 7A depicts in a top view an aircraft having a nose tip oriented in the forward direction with its left airfoil and its right airfoil both deflected less in the beginning of a forward stroke (fore stroke) of the wings than the deflection at the end of the forward stroke which is depicted as larger in deflected angle.
Figure 7C:
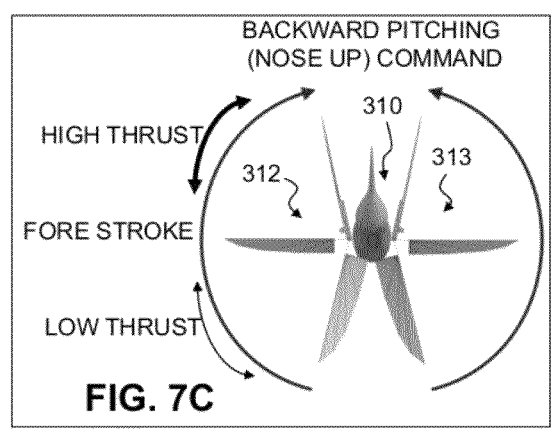
FIG. 7C depicts in a top view an aircraft having a nose tip oriented in the forward direction with its left airfoil and its right airfoil both deflected more in the beginning of a forward stroke (fore stroke) of the wings than the deflection at the end of the forward stroke which is depicted as smaller in deflected angle.
Figure 7B:
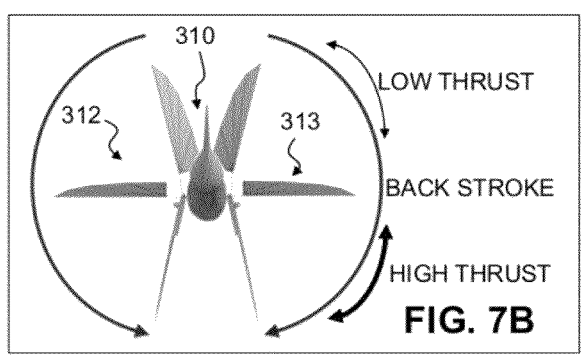
FIG. 7B depicts in a top view an aircraft having a nose tip oriented in the forward direction with its left airfoil and its right airfoil both deflected more in the beginning of a backward stroke (backstroke) of the wings than the deflection at the end of the backward stroke which is depicted as smaller in deflected angle.
Figure 7D:
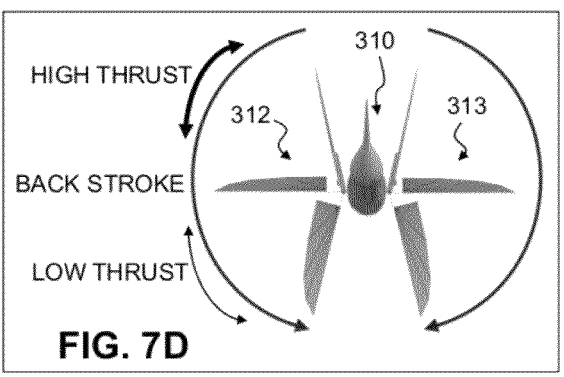
FIG. 7D depicts in a top view an aircraft having a nose tip oriented in the forward direction with its left airfoil and its right airfoil both deflected less in the beginning of a backward stroke (backstroke) of the wings than the deflection at the end of the backward stroke which is depicted as larger in deflected angle.

Pitching moment can be generated by changing the mass balance of the vehicle, differential throttling of the flapping motor or flapping motors, and/or cyclically changing the angles of deflections of the airfoils, i.e., cyclic pitch control. FIG. 7A depicts in a top view an aircraft 310 having a nose tip oriented in the forward direction with its left airfoil 312 and its right airfoil 312 both deflected less in the beginning of a forward stroke (fore stroke) of the wings than the deflection at the end of the forward stroke which is depicted as larger in deflected angle, i.e., a larger sweep angle of deflection. The deflection grows larger as the wing sweeps forward. Accordingly, the wings each generate more thrust upward during the beginning of the forward stroke than at the end of the forward stroke. FIG. 7B depicts in a top view an aircraft 310 having a nose tip oriented in the forward direction with its left airfoil 312 and its right airfoil 313 both deflected more in the beginning of a backward stroke (backstroke) of the wings than the deflection at the end of the backward stroke which is depicted as smaller in deflected angle, i.e., a smaller sweep angle of deflection. The deflection grows smaller as the wing sweeps backward. Accordingly, the wings each generate more thrust upward during the beginning of the backward stroke than at the end of the backward stroke. Accordingly, this cyclic pitch control generates a forward pitching moment, i.e., a pitching control authority about the vehicle in an angular direction that is nose downward. FIG. 7C depicts in a top view an aircraft 310 having a nose tip oriented in the forward direction with its left airfoil 312 and its right airfoil 313 both deflected more in the beginning of a forward stroke (fore stroke) of the wings than the deflection at the end of the forward stroke—which is depicted as smaller in deflected angle, i.e., a smaller sweep angle of deflection. The deflection grows smaller as the wing sweeps forward. Accordingly, the wings each generate less thrust upward during the beginning of the forward stroke than at the end of the forward stroke. FIG. 7D depicts in a top view an aircraft 310 having a nose tip oriented in the forward direction with its left airfoil 312 and its right airfoil 313 both deflected less in the beginning of a backward stroke (backstroke) of the wings than the deflection at the end of the backward stroke which is depicted as larger in deflected angle, i.e., a larger sweep angle of deflection. The deflection grows larger as the wing sweeps backward. Accordingly, the wings each generate less thrust upward during the beginning of the backward stroke than at the end of the backward stroke. Accordingly, this cyclic pitch control generates a backward pitching moment, i.e., a pitching control authority about the vehicle in an angular direction that is nose upward.

FIGS. 8A and 8B depict idealized instantaneous thrust vectors 810-811, 830-831 for the left and right sides of a vehicle such as in FIGS. 7A and 7B respectively, and an idealized average cumulative thrust vector 820, 840 for the vehicle such as in FIGS. 7A and 7B respectively. Exemplary wing deflections are depicted for each wing at four positions in a stroke. Accordingly, the vehicle generates pitch moment to effect a forward (nose down) maneuver. FIGS. 8C and 8D depict idealized instantaneous thrust vectors 850-851, 870-871 for the left and right sides of a vehicle such as in FIGS. 7C and 7D respectively, and an idealized average cumulative thrust vector 860, 880 for the vehicle such as in FIGS. 7C and 7D respectively. Exemplary wing deflections are depicted for each wing at four positions in a stroke. Accordingly, the vehicle generates pitch moment to effect a backward (nose up) maneuver.

Figure 9:
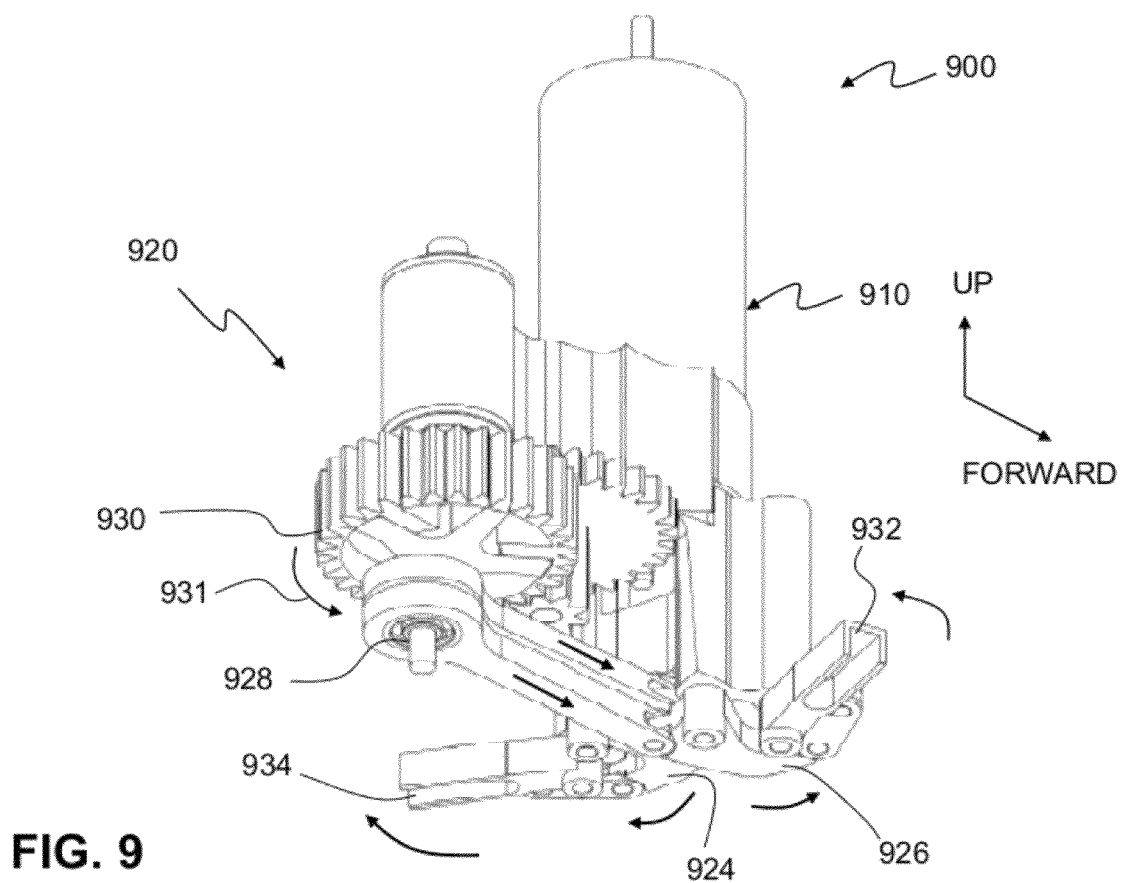
FIG. 9 depicts an exemplary flapping drive assembly including a motor, a gearing assembly, a left arm and a right arm rotatably attached at a pin of a drive gear, where the pin is offset from the center of rotation of the drive gear.

FIG. 9 depicts an exemplary flapping drive assembly 900 including a motor 910, a gearing assembly 920, a left arm 924 and a right arm 926 rotatably attached at a pin 928 of a drive gear 930, where the pin is offset from the center of rotation of the drive gear 930. When the drive gear is rotated 931, the exemplary left rocker arm 924 and right rocker arm 926 are cyclically pushed and pulled, and thereby cause the left mast receiver 934 and the right mast receiver 932 to swing forward and backward.

FIG. 10A depicts, for a flapping drive assembly, the disposition of a first capstan 1012 relative to the center of rotation of a rotating element 1010 that may be a gear. The second capstan (not shown in this view) is interposed between the first capstan 1012 and the rotating element 1010, and both the first capstan 1012 and second capstan are mounted about a shaft 1001 that is offset from the center of rotation 1002 of a rotating element 1010. FIG. 10B depicts an exemplary flapping drive assembly and mechanism 1000 comprising: (a) a rotating element 1010 having a center of rotation and a plane of rotation; (b) a first capstan 1012 mounted about a shaft (not shown), the shaft attached to the rotating element 1010 distal from the center of rotation and substantially perpendicular to the plane of rotation; (c) a second capstan 1018 mounted about the shaft; (d) a first arm 1032 mounted to a third capstan 1022, a first linking member 1020 connecting the third capstan 1022 with the first capstan 1012; (e) a second arm 1030 mounted to a fourth capstan 1024, a second linking member 1017 connecting the fourth capstan 1024 with the first capstan 1012; and (f) a third linking member 1023 connecting the third capstan 1022 with the fourth capstan 1024. In some embodiments of the mechanism, the third capstan 1022 of the mechanism may have a center of rotation, the fourth capstan 1024 may have a center of rotation, and the center of rotation of the rotating element 1010 may be substantially collinear with both the center of rotation of the third capstan 1022 and the center of rotation of the fourth capstan 1024. In some embodiments of the mechanism, the first linking member 1020 may comprise a cord, the second linking member 1017 may comprise a cord, and the third linking member 1023 may comprise a cord. A left wing assembly 1028 is depicted engaging the first arm 1032 and a right wing assembly 1026 is depicted as engaging the second arm 1030. Accordingly, a motor drives 1050 the offset capstans to effect flapping of the two wing assemblies.

Figure 11A:
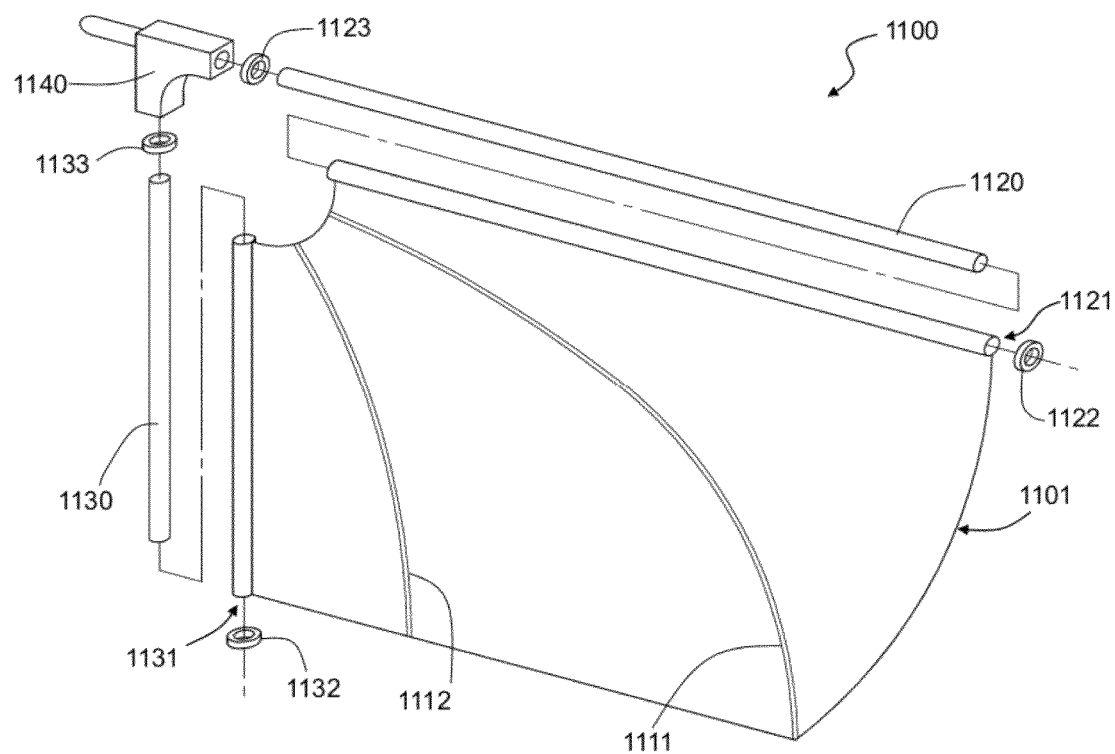
FIG. 11A depicts in exploded view an exemplary wing.
Figure 11B:
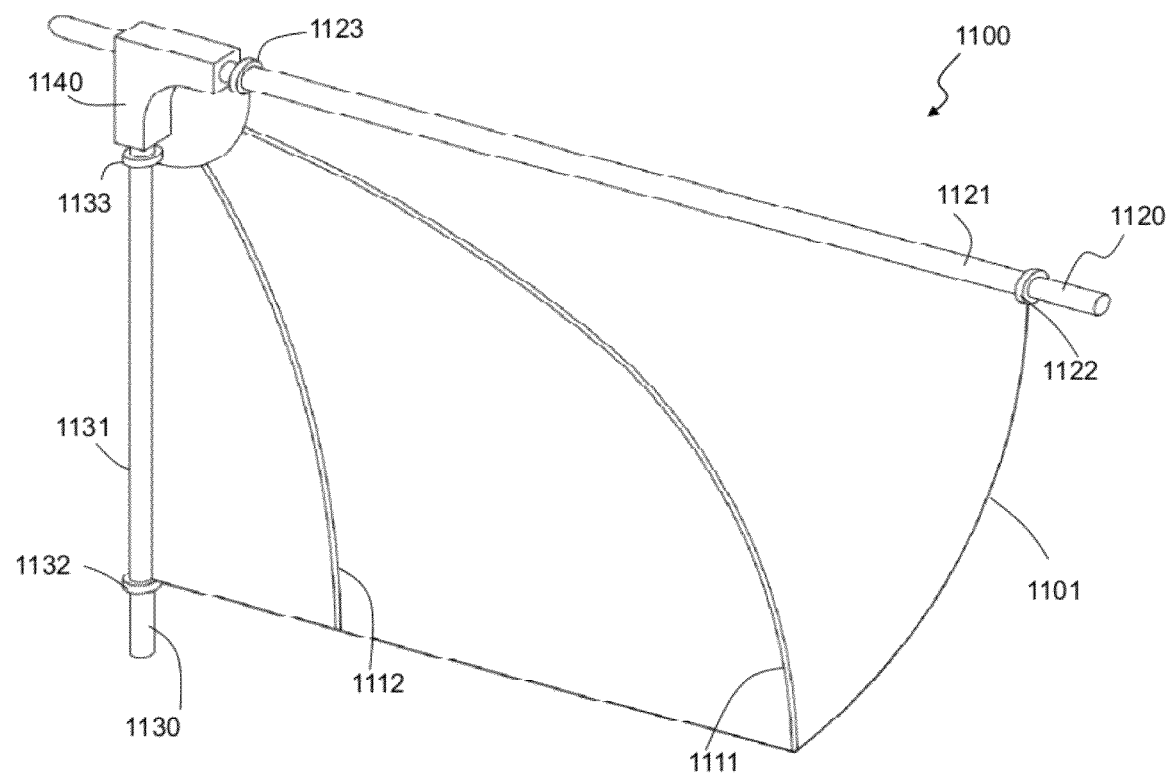
FIG. 11B depicts an assembled exemplary wing.

FIG. 11A depicts in exploded view an exemplary wing 1100 having two curved battens 1111, 1112, where a mast element 1120 is inserted into a leading edge sleeve 1121 of a wing airfoil membrane 1101. The sleeve 1121 may be formed by drawing the airfoil membrane back on itself and/or may include a tube for receiving the mast element—a tube about which the airfoil may be wrapped and fixed. Resilient washers 1122, 1123 may be deposed at the proximal and distal portions of the mast element 1120 on each side of the leading edge sleeve 1121. A root spar element 1130, or boom element, is inserted into the root spar sleeve 1131 of the wing airfoil membrane 1101. The boom sleeve 1131 may be formed by drawing the airfoil back on itself and/or may include a tube for receiving the mast element—a tube about which the airfoil may be wrapped and fixed. Resilient washers 1132, 1133 may be deposed at the proximal and distal portions of the root spar element 1130 on each side of the boom sleeve 1131. The mast element 1120 and boom element 1130 engage a corner element 1140, or arm fitment, that is configured to be received by an arm socket element (not shown). FIG. 11B depicts an assembled exemplary wing 1100. The membrane may be made of extruded polyethylene foam sheet, e.g., having 1/32 inch thickness such as packing foam sheets. The battens 1111, 1112, mast element 1120, boom element 1130, and sleeve tubes 1121, 1131 may be made of carbon filaments. The wing 1100 may further include a pocket made from overlapping the membrane proximate to the root spar, or boom, and interposing between the layers of membrane a layer of foam fabric. The foam fabric may damp vibrations and reduce acoustical effects of flapping.

Figure 12:
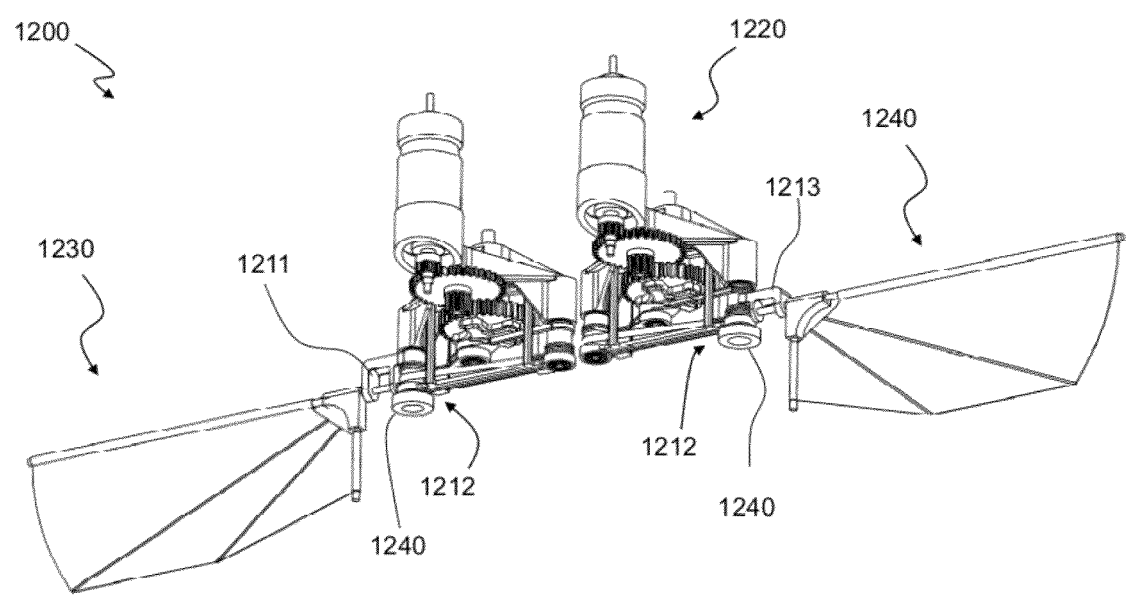
FIG. 12 depicts an exemplary flapping drive assembly and mechanism, similar to combining a pair of the embodiments of FIG. 10, where each has four capstans.

FIG. 12 depicts an exemplary flapping drive assembly and mechanism 1200 comprising a left flapping drive assembly 1210 and a right flapping drive assembly 1220, similar to combining a pair of the embodiments of FIG. 10B, where each right and left flapping drive assemblies has four capstans, but one arm for a wing assembly. The embodiment of FIG. 12 depicts a left wing assembly 1230 engaging the arm of a left portion 1211 of the flapping drive assembly 1200, where the arm 1211 of the left assembly 1210 engages the third capstan 1212 of the left assembly 1210. The embodiment of FIG. 12 also depicts a right wing assembly 1240 engaging the arm 1213 of the right assembly 1220, where the arm 1213 of the right assembly 1220 engages the fourth capstan 1212 of the right assembly 1220. In this exemplary embodiment, a processor such as a central processing unit (CPU), having load instructions, maintains synchronization between the left and right motor by monitoring inputs from wing position sensors 1240, 1241. Pitch control authority may be generated by differential front and rear engine throttling. Yaw control authority may be generated by differential forestroke and rearstroke throttling, and roll control authority may be generated by differential midstroke and endstroke throttling, and done so with a wing-mounted spring, e.g., a luffing spring attached to the root spar, or boom. Accordingly, servos to adjust the angles of deflection of the wings are not required for this exemplary embodiment.

Figure 13:
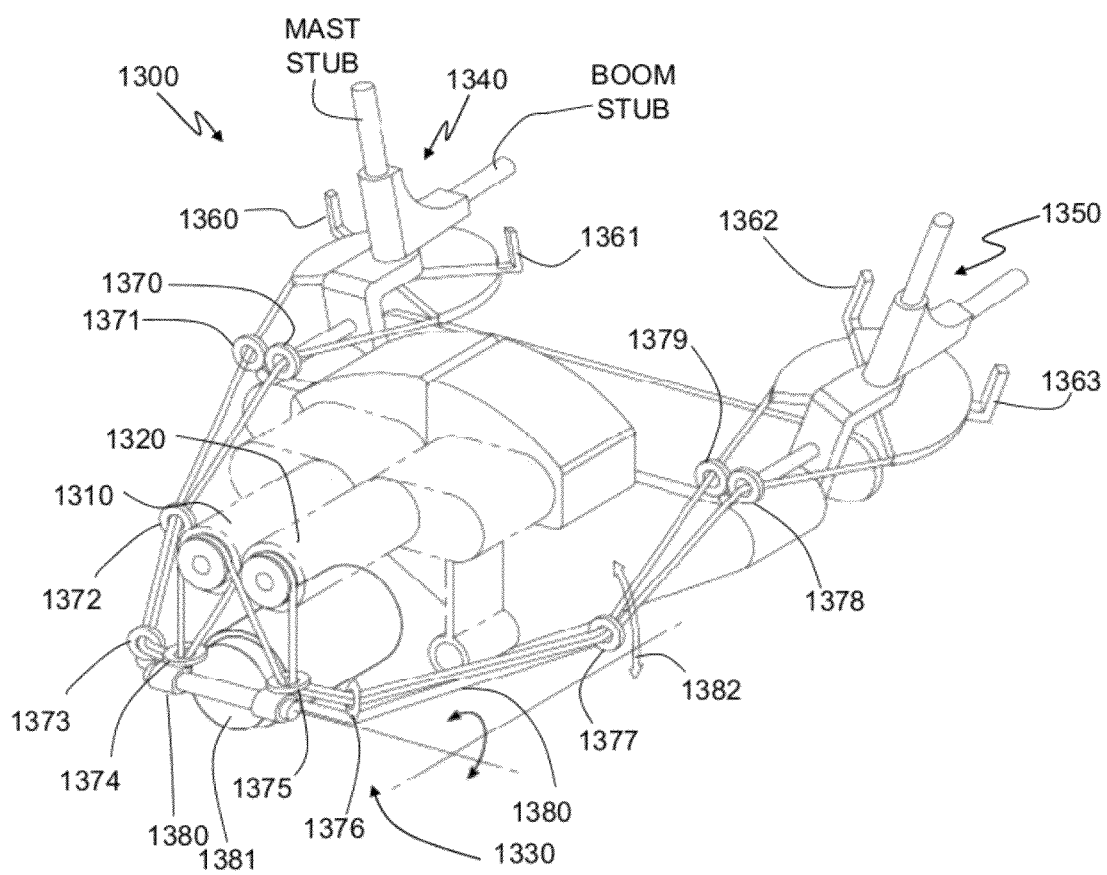
FIG. 13 depicts an exemplary assembly for limiting root spar, or boom, travel.
Figure 14A:
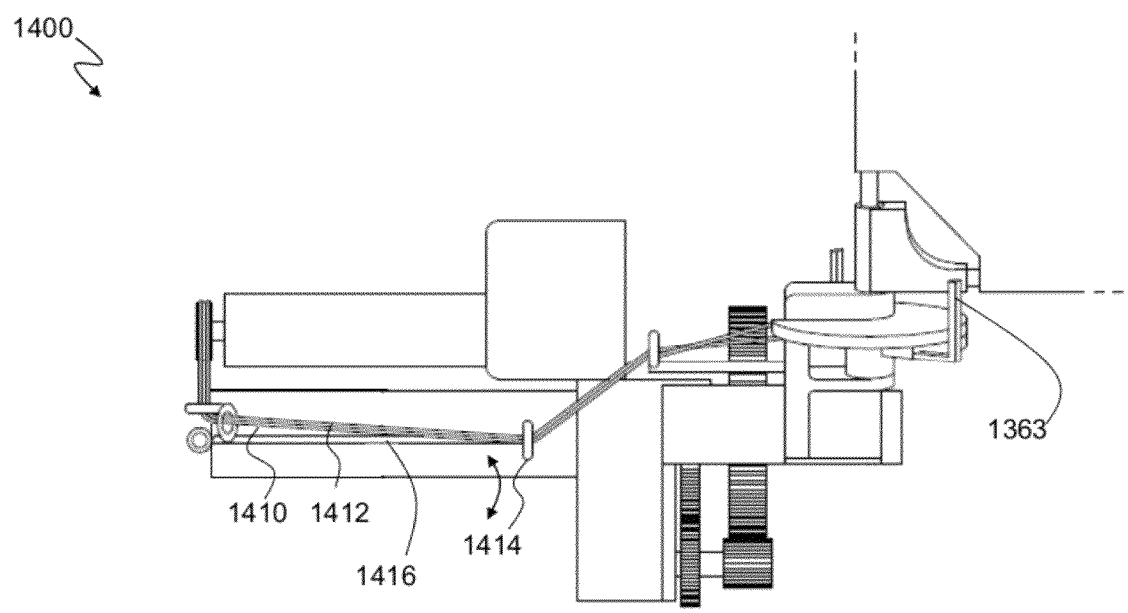
FIGS. 14A-14C depict in a side view the exemplary assembly of FIG. 13.
Figure 14B:
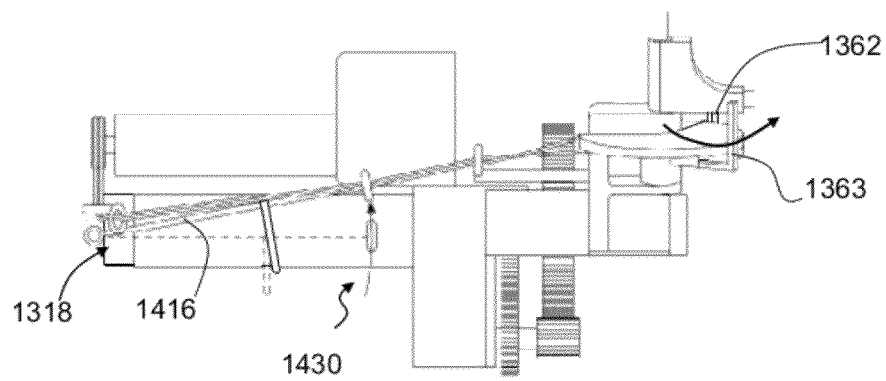
Figure 14C:
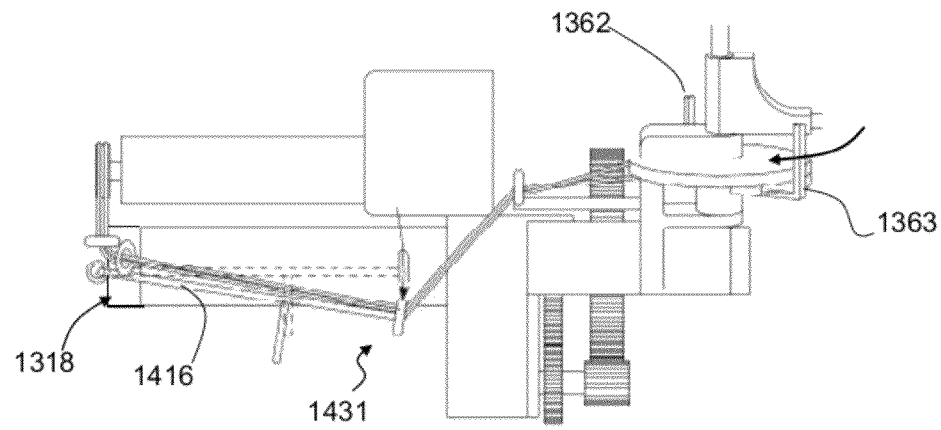

FIG. 13 depicts an exemplary assembly for limiting root spar, or boom, travel 1300. Two servos 1310, 1320 are used, each controlling by a string, or a cord, fed via eyelets 1370-1379, and a pulley system 1330 the position of boom stops, 1360-1363, to allow for differential deflection of each airfoil (not shown). Each boom stop is affixed to a rocker-like pulley element that may be in tension, and the drawing back on the string opens the angle between opposing boom stops. A pair of boom stops are disposed on each of the arms of the flapping assembly so that the boom stops rotate with the flapping arm to limit the travel of the proximal end of the boom. Accordingly, roll and yaw authority may be generated during mast flapping by the positioning of the boom stops. Aerodynamic forces tend to cause the boom to stop on the trailing boom stop of the stroke, i.e., the aftward boom stop during a forward stroke and the forward boom stop during a backward stroke. A handlebar-like structure 1380 may be added that may be rotated 1382, via a pitch servo 1381, to extend or retract, in conjunction with the mast flapping motion, the boom stops on each wing. The handlebar-like structure 1340, 1350 may be used to generate pitch authority during flapping by continually repositioning the boom stops during strokes. FIG. 14A depicts in a side view the exemplary assembly 1400 of FIG. 13 where the pair of strings or cords 1410, 1412 are shown threaded though an eyelet 1414 at end of an arm of the handlebar-like structure 1416. The servo shown may be disposed proximate to the flapping motor and the flapping drive assembly. A boom stop 1363 may be mounted on a pulley element that itself is mounted in tension to a support structure. FIG. 14B depicts a rotation 1430 of the handlebar element 1416 by the pitch servo 1318 causing the strings to allow the boom stops 1363, 1362 to retract, for a particular portion of the stroke. That is, the stings would draw on the boom stop pulleys as the mast rotates (out of the page in this illustration). FIG. 13B depicts a rotation 1431 of the handle bar element by the pitch servo 1318 causing the strings to draw on the boom stops 1362, 1363 to extend the angle between each for a particular portion of the stroke.

Figure 15A:
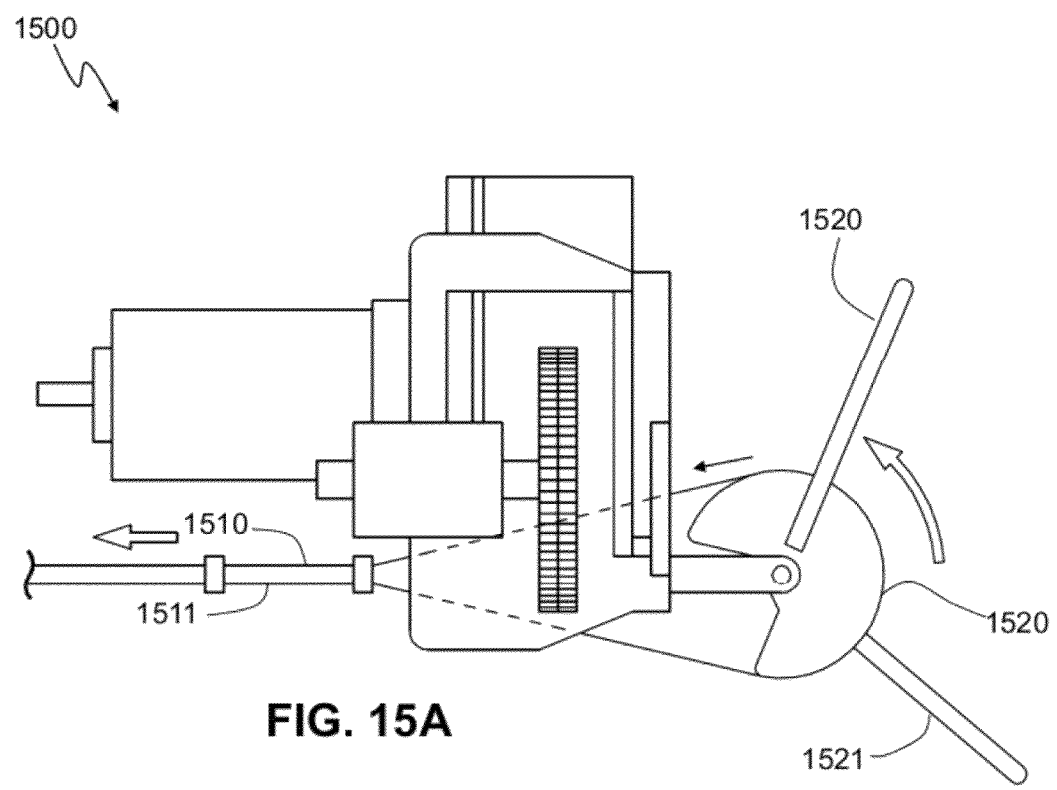
FIG. 15A depicts the motion of a string to rotate the position of a first boom stop by rotating a first pulley element about a pivot point on a support structure.
Figure 15B:
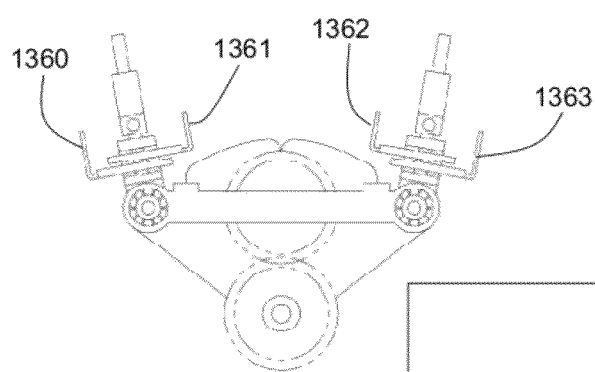
FIG. 15B depicts in a bottom up view the boom stops extended of a relatively high deflecting angle of the boom for a first wing position of a stroke.
Figure 15C:
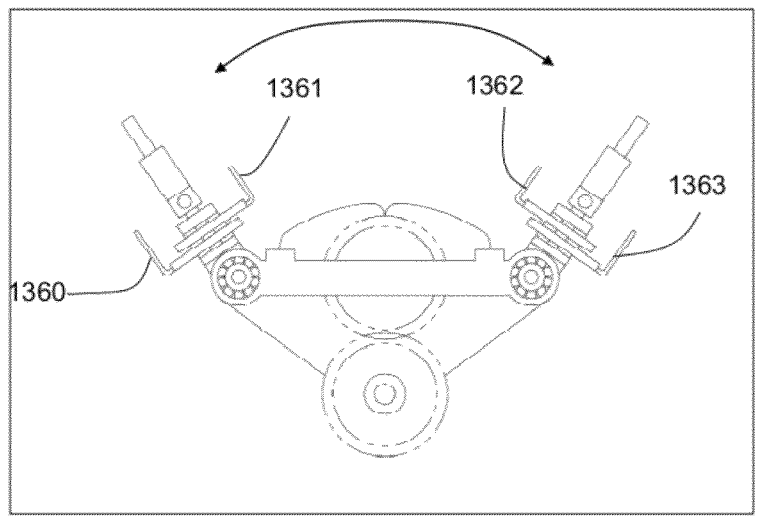
FIG. 15C depicts in a bottom up view the boom stops extended of a relatively high deflecting angle of the boom for a second wing position of a stroke.

In a view orthogonal to the plane of a mast and root spar, or boom, FIG. 15A depicts the motion of a string 1510 to rotate the position of a first boom stop 1520 by rotating a first pulley element (obstructed in this view by a second pulley element 1530) about a pivot point on a support structure. Also depicted in FIG. 15A is a second string 1511 that does not move in this example, leaving the second boom stop 1521 in a stationary position—at this position in a stroke—as the tension in the string balances the tension in the mounted second pulley element 1530. FIG. 15B depicts in a bottom up view of FIG. 13 where the boom stops 1360-1363 are extended to a relatively high deflecting angle of the boom. FIG. 15B depicts the bottom up view of FIG. 13 where the flapping motion of the arms has caused the wings to change relative angles in the stroke, and that the boom stop 1360-1363 remain extended as the same angle as in FIG. 15B. That is, the pitch actuator may be at a neutral position so as to not affect the deflection angle during a stroke of the exemplary embodiment of FIG. 14A.

Figure 16:
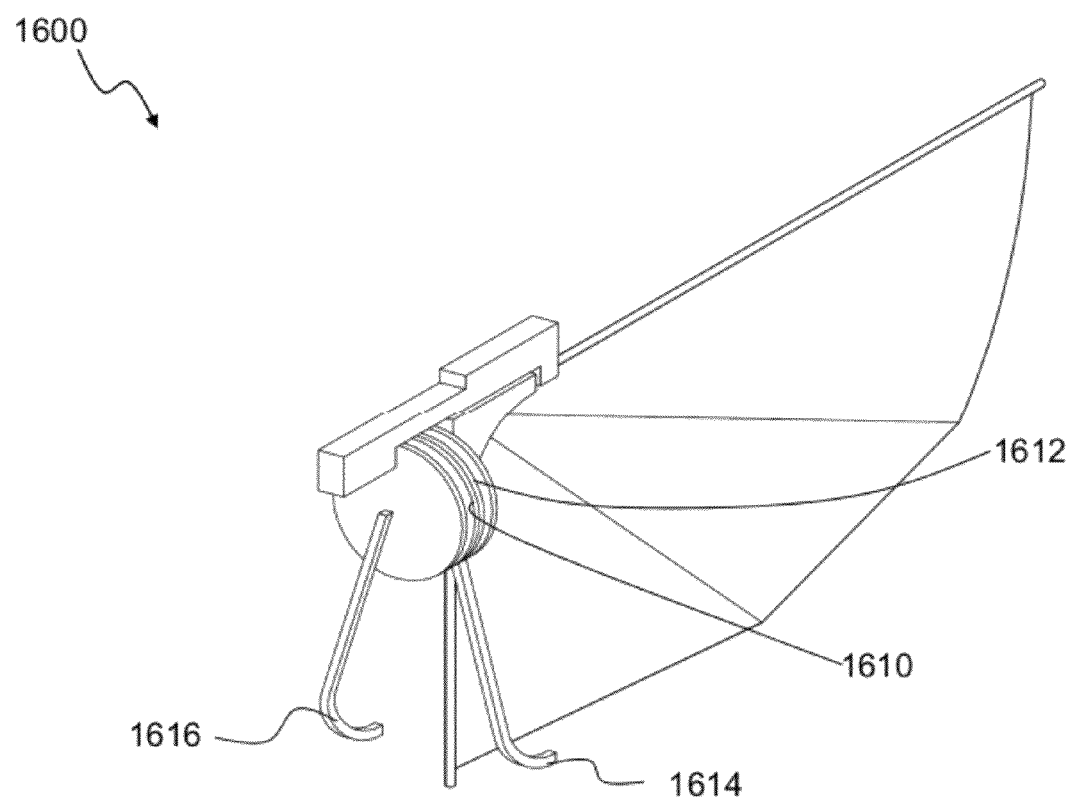
FIG. 16 depicts a wing assembly and the pair of pulley elements for the boom stops.
Figure 17A:
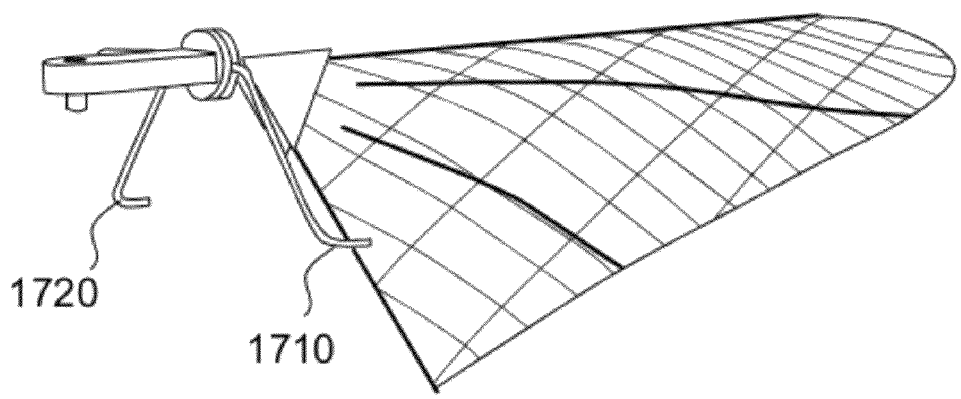
FIG. 17A depicts an example where each boom stop is positioned to allow for a relatively large deflection angle, compared to 17B, for both the forward stroke and the backward stroke.
Figure 17B:
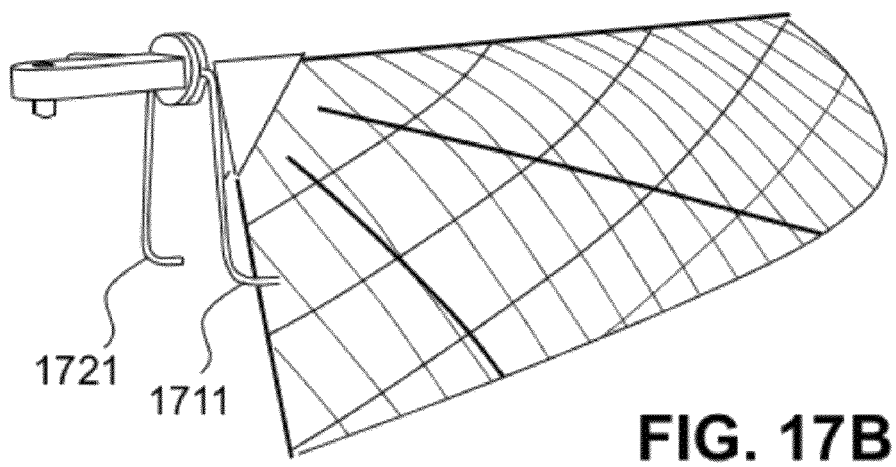
FIG. 17B depicts an example where each boom stop is positioned to allow for a relatively small deflection angle, compared to 17A, for both the forward stroke and the backward stroke.
Figures 18A, 18B, 18C:
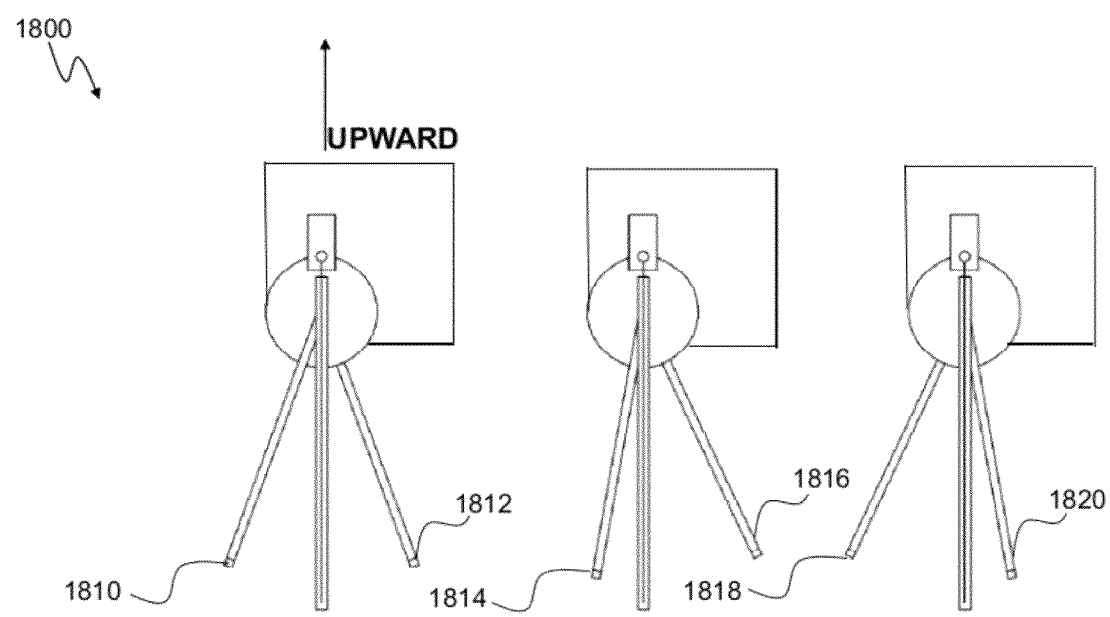
FIG. 18A depicts stops in a neutral position as to the yaw channel.
FIG. 18B depicts stops biased to the right where the flapping of the wing and movement of the boom between the two stops—to one stop during the forward stroke and to the other stop during the rearward stroke—would generate a thrust vector having a right-oriented component.
FIG. 18C depicts stops biased to the left where the flapping of the wing and movement of the boom between the two stops—to one stop during the forward stroke and to the other stop during the rearward stroke—would generate a thrust vector having a left-oriented component.

FIG. 16 depicts a wing assembly 1600 and the pair of pulley elements for the boom stops 1614, 1616. With the application of the two strings, each that may be under the control of a bi-directional servo (not shown), each pulley element may be placed in tension and each boom stop may be angularly positioned independent of the other. FIG. 17A depicts an example where each boom stop 1710, 1720 is positioned to allow a relatively large deflection angle for both the forward stroke and the backward stroke. With the stops opened wide, a flapping wing such as this has a relatively low angle of attack and generates relatively low thrust. In contrast, FIG. 17B depicts an example where each boom stop 1711, 17 +21 is positioned to allow a relatively small deflection angle for both the forward stroke and the backward stroke. With the stops open to a narrow position, a flapping wing such as this has a relatively high angle of attack and generates relatively high thrust with an accompanying relatively larger magnitude of downwash. FIGS. 18A-18C depict yaw control 1800 effected by modulating the boom stops left or right to generate a net yawing moment. FIG. 18A depicts stops 1810, 1812 in a neutral position as to the yaw channel. That is, a flapping arm would have the same boom angle of deflects in the forward stroke as in the backward stroke, i.e., the thrust vector would be aligned with the "upward" direction of the aircraft. FIG. 18B depicts stops 1814, 1816 biased to the right where the flapping of the wing and movement of the boom between the two stops—to one stop during the forward stroke and to the other stop during the rearward stroke—would generate a thrust vector having a right-oriented component. Accordingly, during flapping, the vehicle effecting stops biased to the right would execute a nose left command. FIG. 18C depicts stops 1818, 1820 biased to the left where the flapping of the wing and movement of the boom between the two stops—to one stop during the forward stroke and to the other stop during the rearward stroke—would generate a thrust vector having a left-oriented component. Accordingly, during flapping, the vehicle effecting stops biased to the left would execute a nose right command.

FIG. 19 depicts an alternate means of boom travel control 1900 where a cord or string is controlled by a servo (not shown) and fed, via eyelets 1911, 1912 on a yoke 1910, to the boom 1920, and fixed at a distal portion of the boom. FIGS. 20A and 20B depicts control of the orientation of the boom 2024 during flapping 2010, 2020, and the orientation of the boom 2024 may be effected by rotating the cord 2030 or string to position the boom for a backward stoke, as in FIG. 20A, and by rotating the cord 2022 or string to position the boom 2024 for a backward stroke. The positioned deflection angle may be effected during a stroke and thus may effect control authority for pitch (e.g., via cyclic modulation), yaw, and roll based on a continually changing servo position commands.

Figure 21A:
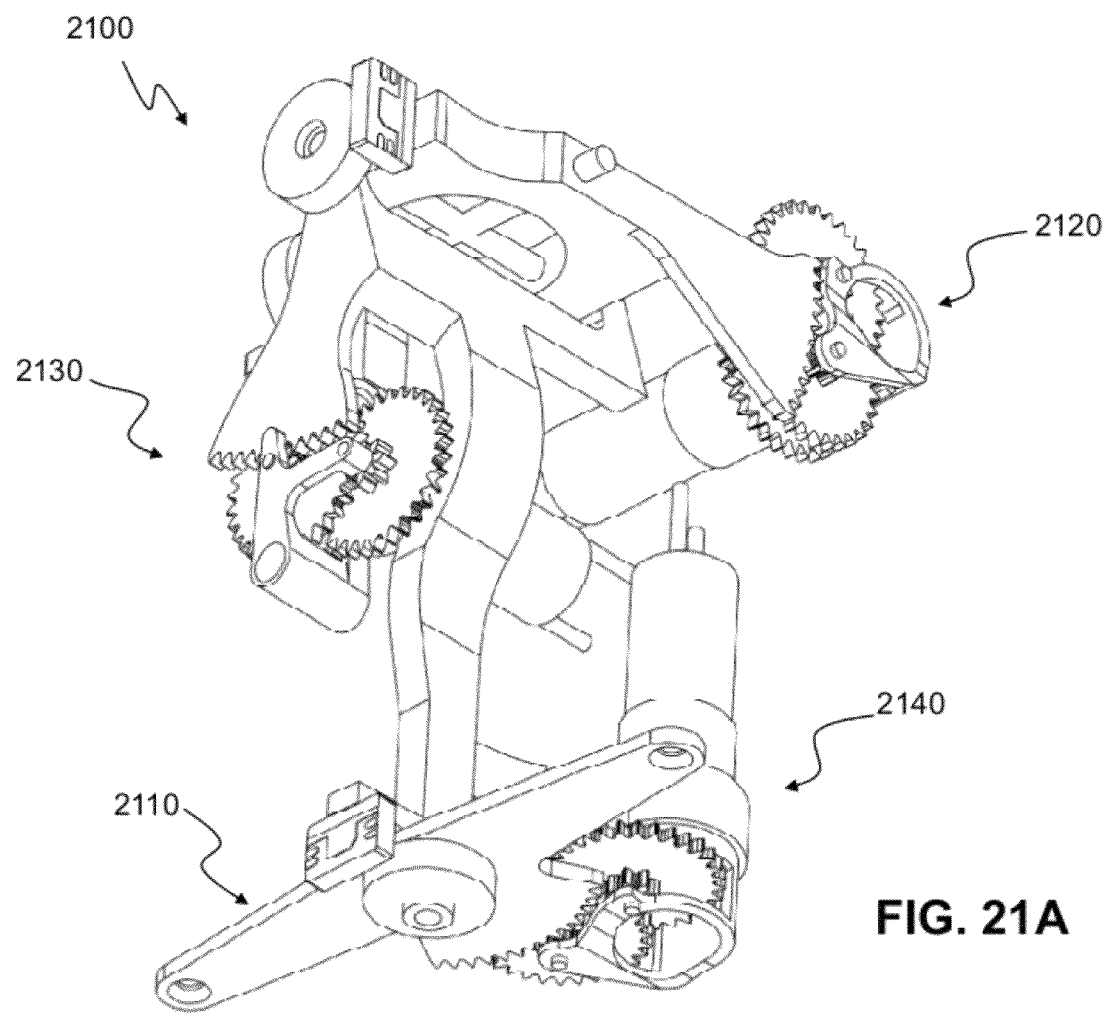
FIG. 21A depicts a three-axis servo boom yang assembly.

A structural element termed a yang may be attached to the wing-boom structure via a ball joint a multiple axis joint and may dispose generally parallel to the boom. The boom or the yang may engage a yoke and the luffing of the membrane can be affected by the motions of the yoke. FIG. 21A depicts a three-axis servo boom and/or yang assembly 2100 as another means of boom travel control where a boom (or yang) restraining yoke 2110 may increase or reduce luffing, i.e., the affects of the wing membrane slack, for both wings during a stroke to generate pitch control authority via a first servo and gearing assembly 2120; effect a differential amount of luff between the wings during a stroke to generate roll control authority via a second servo and gearing assembly 2130; and optionally effect a bias in boom travel via a third servo and gearing assembly 2140 to generate a luff differential for yaw control. Accordingly, the assembly 2100 provides multiple axes of orientation for the yoke to the body of the aircraft to adjust wing membrane luff during strokes to effect three axes of control.

Figure 21B:
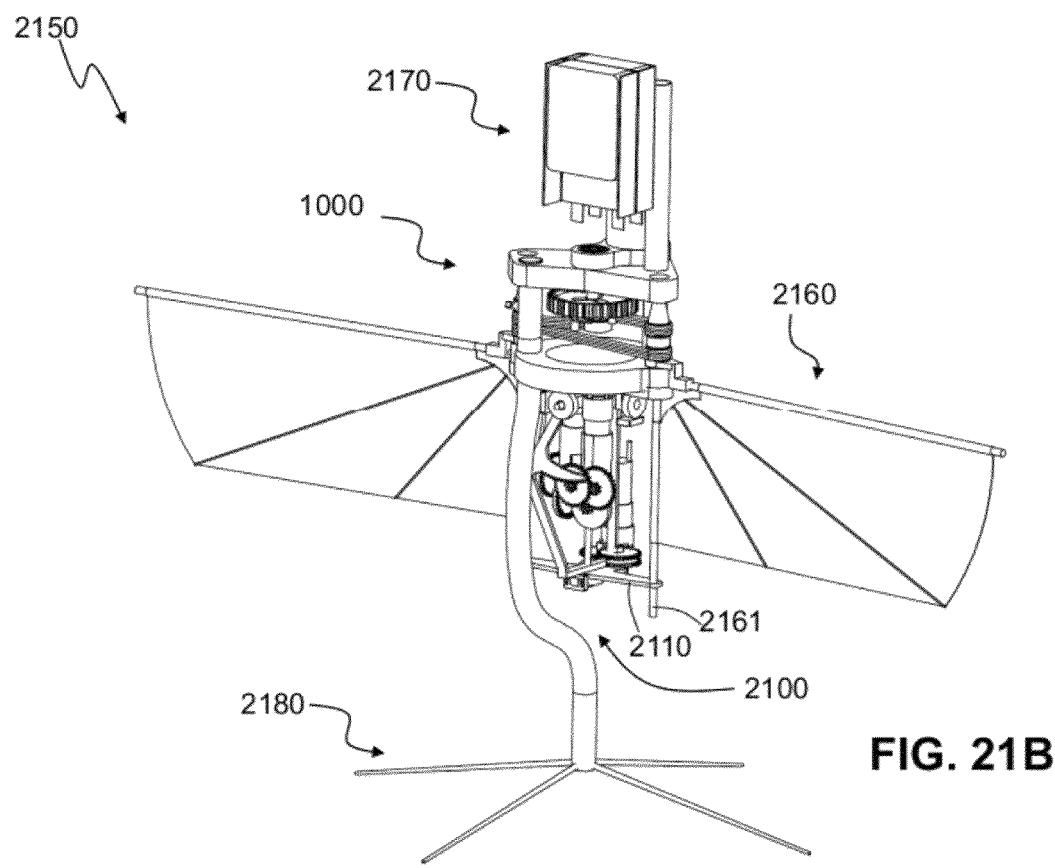
FIG. 21B depicts an exemplary aircraft having a flapping mechanism.
Figure 22:
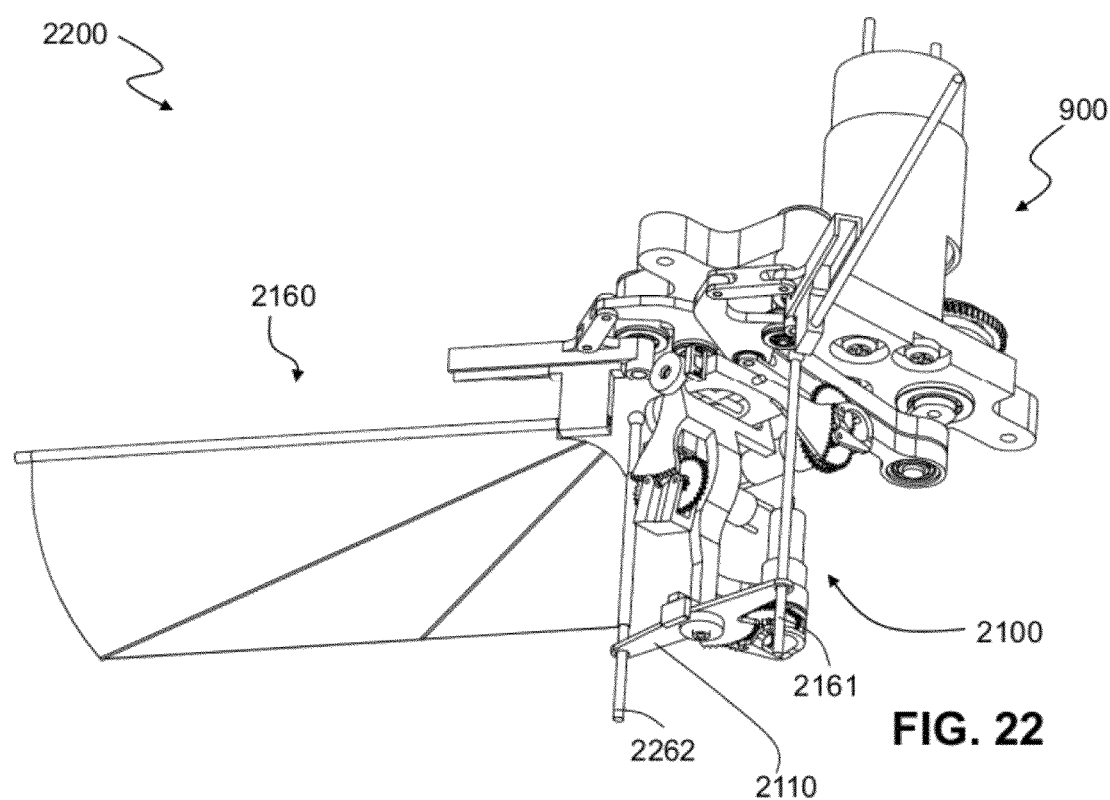
FIG. 22 depicts a portion of an exemplary aircraft having a flapping mechanism.
Figure 23:
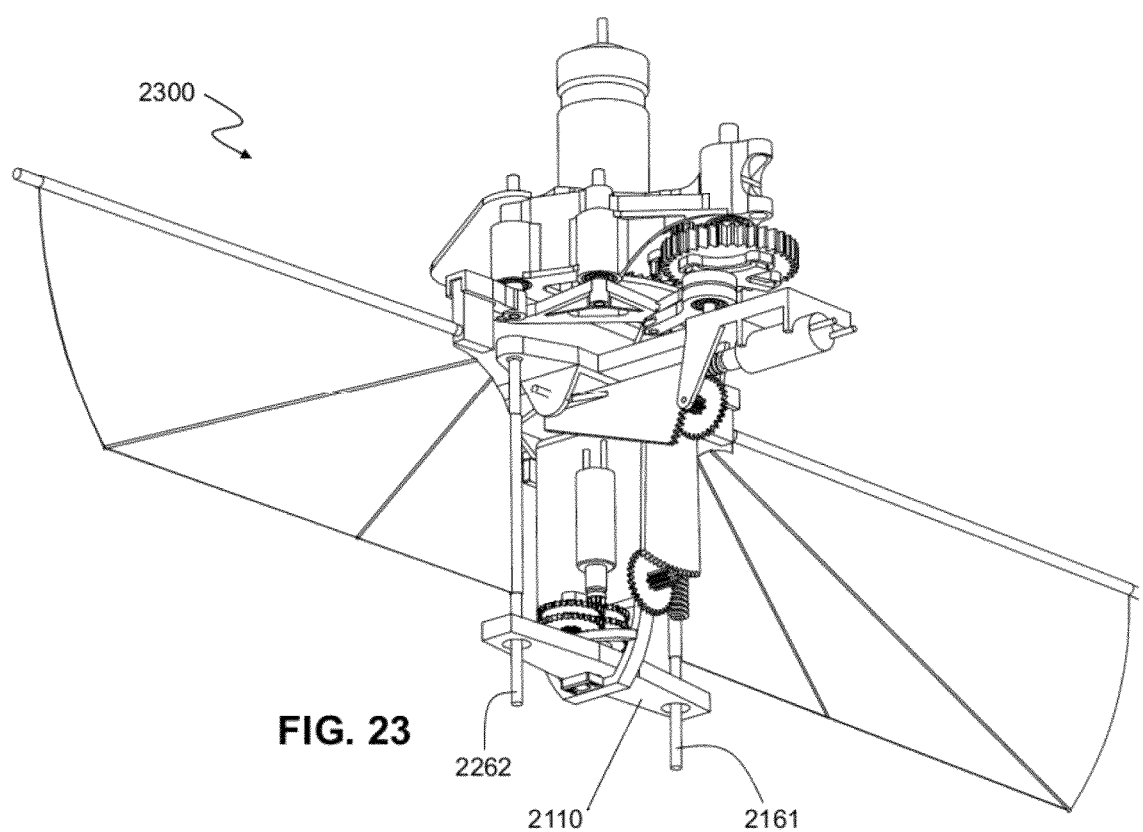
FIG. 23 depicts a portion of an exemplary aircraft having a flapping mechanism.
Figure 24A:
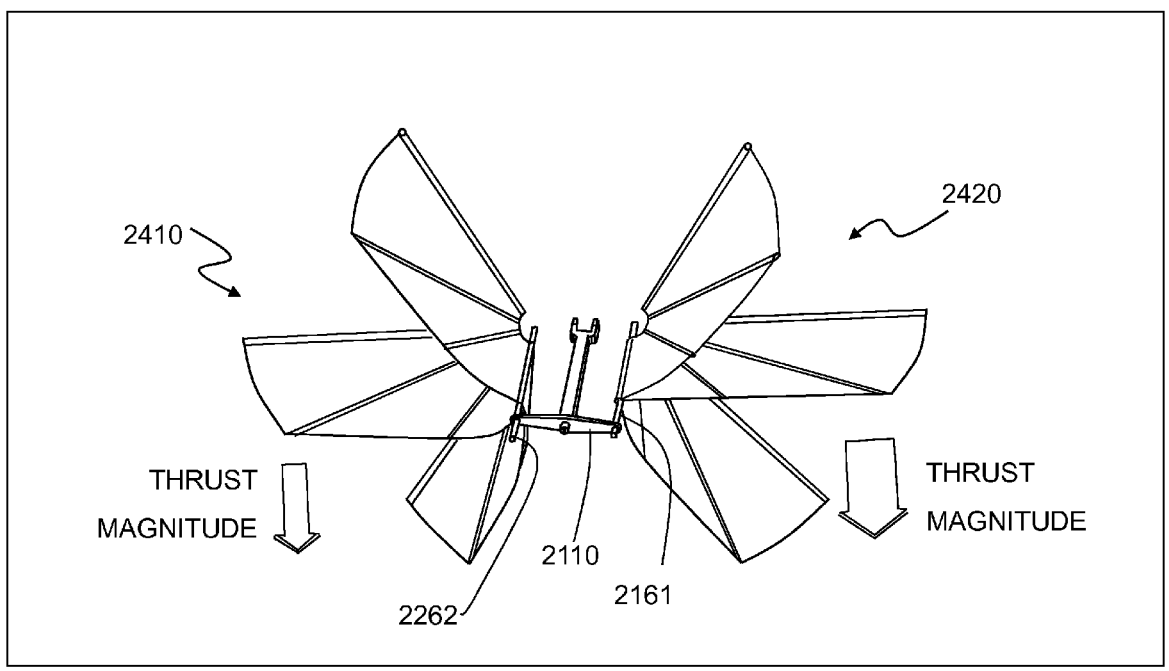
FIG. 24A depicts the gimbaled yoke tilted toward the left airfoil and away from the right airfoil.
Figure 24B:
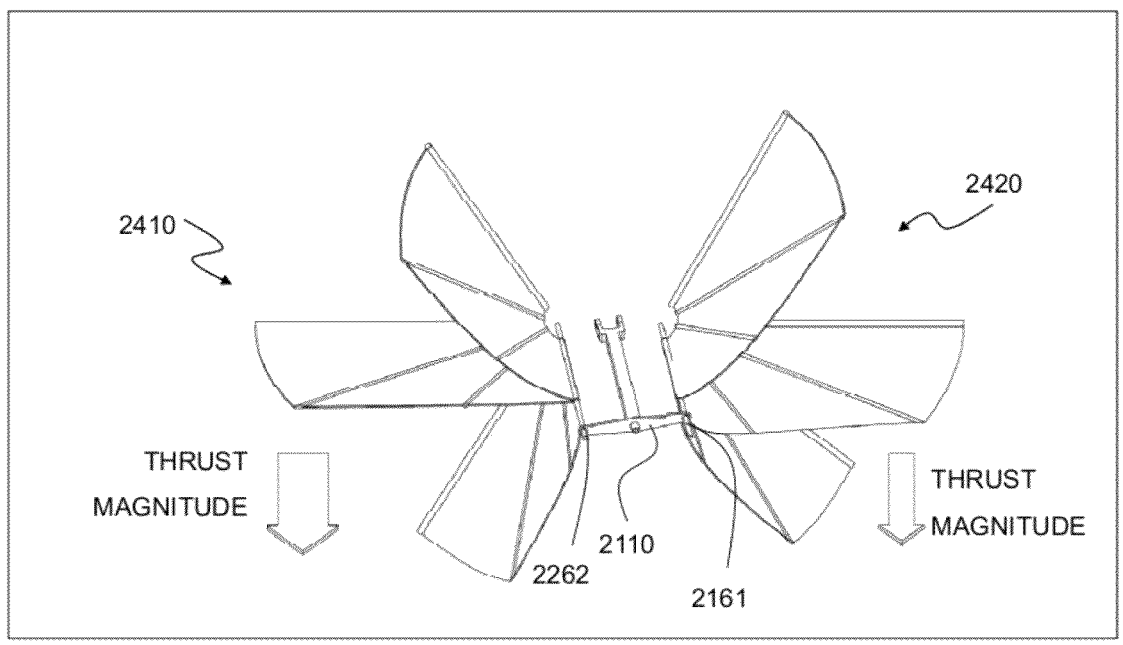
FIG. 24B depicts the gimbaled yoke tilted toward the right airfoil and away from the right airfoil.

FIG. 21B depicts an exemplary aircraft having a flapping mechanism 2100 as described in FIG. 10B (1000), and the root spar, or boom, control mechanism as described in FIG. 21A (2100). In the embodiment of FIG. 21B, the boom 2161 of each wing 2160 engage the yoke 2110. Also depicted above the flapping mechanism are a power and processing module 2170. The vehicle may include an optional stand 2180. FIG. 22 depicts a portion of an exemplary aircraft 2200 having a flapping mechanism as described in FIG. 9 (900), and the root spar, or boom, control mechanism as described in FIG. 21A, where the root spars 2161, 2262 engage the yoke 2110. The FIG. 23 depict a portion of an exemplary aircraft 2300 having a flapping mechanism as described in FIG. 9 (900), and another embodiment of the root spar, or boom, control mechanism as described in FIG. 21A (2100), where the root spars 2161, 2262 engage the yoke 2110. FIG. 24A depicts the positionable yoke 2110 tilted toward the left airfoil 2410 and away from the right airfoil 2420. The masts of each wing remain in the flapping plane and so the luffing, or wing slack effect, of the left airfoil 2410 enhances as the membrane is looser than the right airfoil 2420, and accordingly the left airfoil 2410 generates less thrust than the right airfoil 2420. FIG. 24B depicts the gimbaled yoke tilted toward the right airfoil 2410 and away from the right airfoil 2420. The masts of each wing remain in the flapping plane and so the luffing of the right airfoil is more than the luffing of the left airfoil 2420, and accordingly the right airfoil 2420 generates less thrust than the left airfoil 2410. FIGS. 24A and 24B illustrate a roll control authority for this exemplary embodiment. The control gimbal having a yoke may directly move the trailing edge ends of the root spars to manipulate the luff in the wing.

Figure 25A:
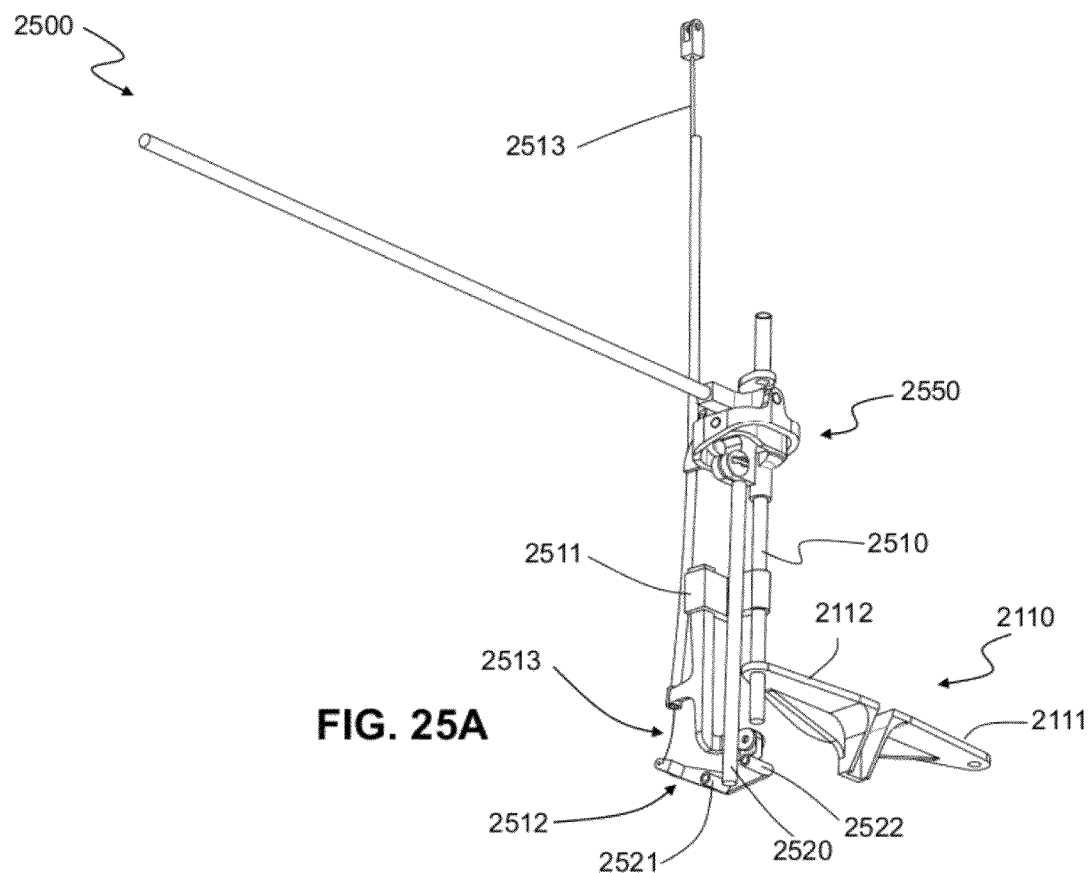
FIG. 25A depicts a boom yang system where separate boom yang engages the yoke and provides structural support for a variable boom stop lever.
Figure 25B:
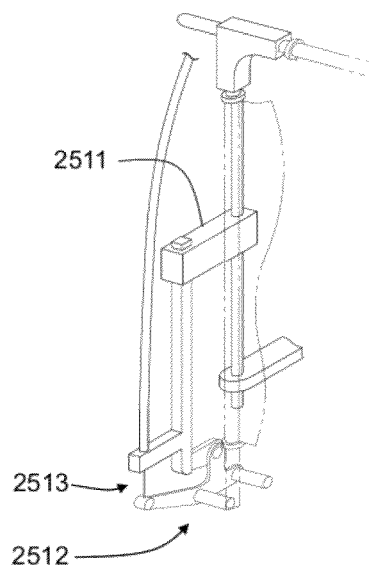
FIG. 25B-25D depict actuation of the boom stop lever for yaw control.
Figure 25C:
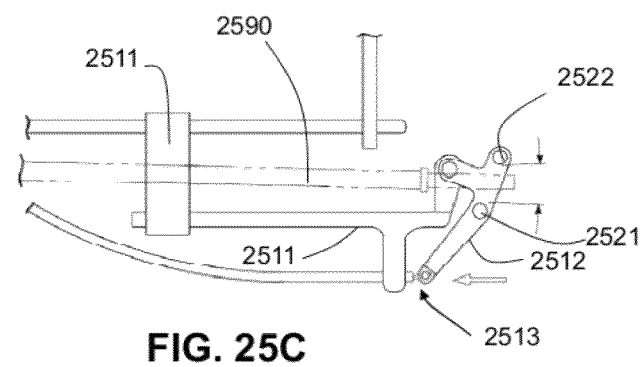
Figure 25D:
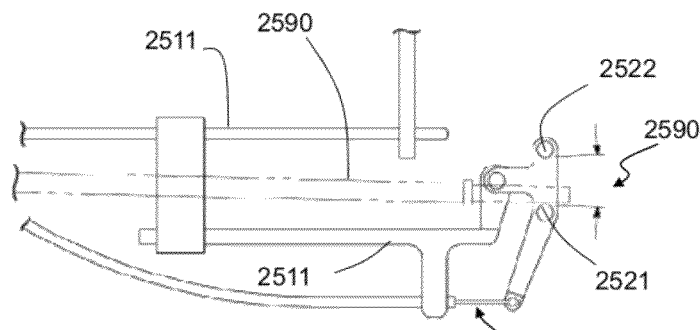

FIG. 25A depicts a boom yang system 2500 where separate boom yang 2510 engages the yoke 2110 and provides structural support 2511 for a variable boom stop lever 2512. Decoupling yaw control from the pitch and roll control provided by the multiple axis yoke positing assembly may be accomplished by allowing the root spar 2520 to move freely between adjustable boom stops 2521, 2522, and having a yang 2510 or other structural element connect the movement of the yoke arms 2111, 2112 of the yoke 2110 with the orientation of the wing at a multiple-axis joint 2550. Accordingly, the roll control may be effected by the side tilt position of the yoke of a two-axis gimbal of servo assembly—similar to the assembly of FIG. 21A but without the yaw servo gear box, and the pitch control may be effected by the fore and aft tilt position of the yoke. A third (yaw) servo is used to control the orientation of the boom stops 2521, 2522 attached to a lever 2512 by pulling or releasing a lever, e.g., via a cable 2513. FIG. 25B depicts an embodiment of the lever 2512, that may be mounted to the yang structure 2511 in tension, and actuated via a cable 2513 attached to the boom yang structure 2511. FIG. 25C depicts the cable 2513 pulling the lever 2512 to shorten the boom 2590 travel distance of the boom stops. FIG. 25D depicts the cable 2513 releasing the lever 2512 to allow the travel distance of the boom 2590 to lengthen.

Figure 26:
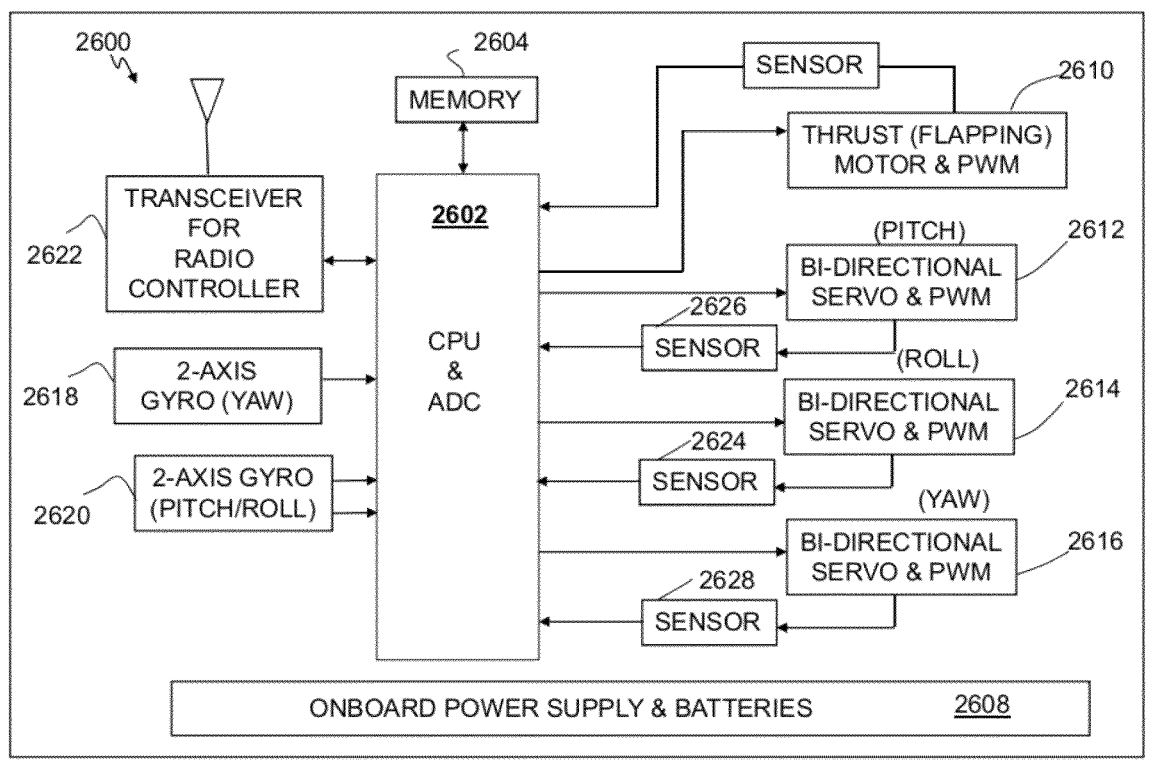
FIG. 26 is an exemplary top level block diagram of the control and propulsion system of an aircraft embodiment.

FIG. 26 is an exemplary top level block diagram of the control and propulsion system of an aircraft embodiment 2600. A central processing unit (CPU) 2602, having addressable memory and drawing from an onboard power supply 2608 comprising a battery, generates voltage commands to at least one drive motor, i.e., a thrust or flapping, motor 2610. The commands may be pulse width modulated (PWM). A Hall sensor may be disposed at the crankshaft so that flapping frequency may be derived and provided to the CPU 2602. In some embodiments there are three control servos 2612, 2614, 2616 and so, FIG. 26 depicts the CPU 2602 generating commands to a pitch bi-directional servo 2612, a roll bi-directional servo 2614, and a yaw bi-directional servo 2616. Position sensors 2624, 2626, 2628 can feed back to the CPU 2602 each servo position 2610, 2612, 2614, 2616. Angular rate measuring devices such as two, two-axis gyroscopes 2618, 2620 may be used to provide yaw angular rate, pitch angular rate, and roll angular rate. The CPU 2602 may provide external command signals from a radio controller 2622 by an uplink and the CPU 2602 may provide status or other information via a downlink. Generally, the CPU 2602 may communicate with an external node via a transceiver. Electrical and/or electronic elements may be powered via an onboard power supply and or local chemical battery elements 2608.

Figure 27:
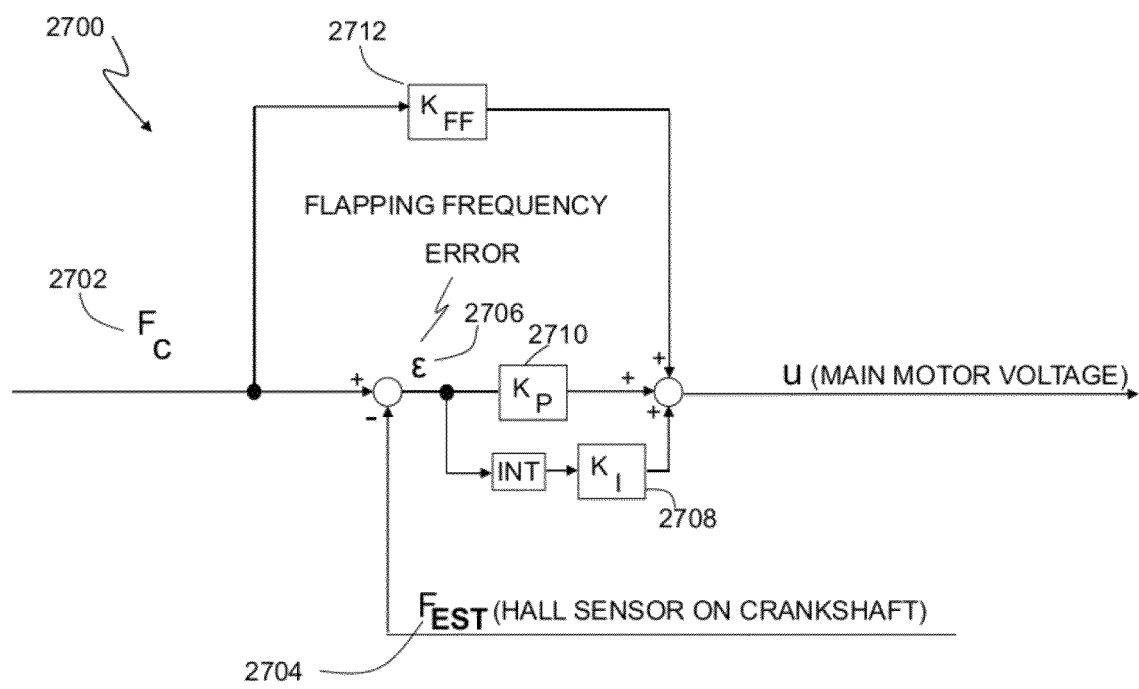
FIG. 27 is a top level functional block diagram of a flapping frequency controller.

FIG. 27 is a top level functional block diagram 2700 of a flapping frequency controller where the command flapping frequency, $F_C$, 2702 and the derived flapping frequency $F_{est}$ 2704 are differenced to generate a flapping frequency error, $\epsilon$ 2706. The flapping frequency error 2706 is integrated and multiplied by a gain, $K_I$, 2708 and the flapping frequency error 2706 is multiplied by a gain, $K_P$ 2710. These two products are combined, along with the product of the flapping frequency multiplied by a gain, $K_{FF}$, 2712 to generate a command, e.g., a main motor voltage command, to the drive or thrust motor for flapping. The flapping frequency controller, along with gains or steps to generate gains, may be expressed in machine-readable language, stored in memory accessible by the aircraft processor, and executed to generate the flapping motor voltage commands.

Figure 28:
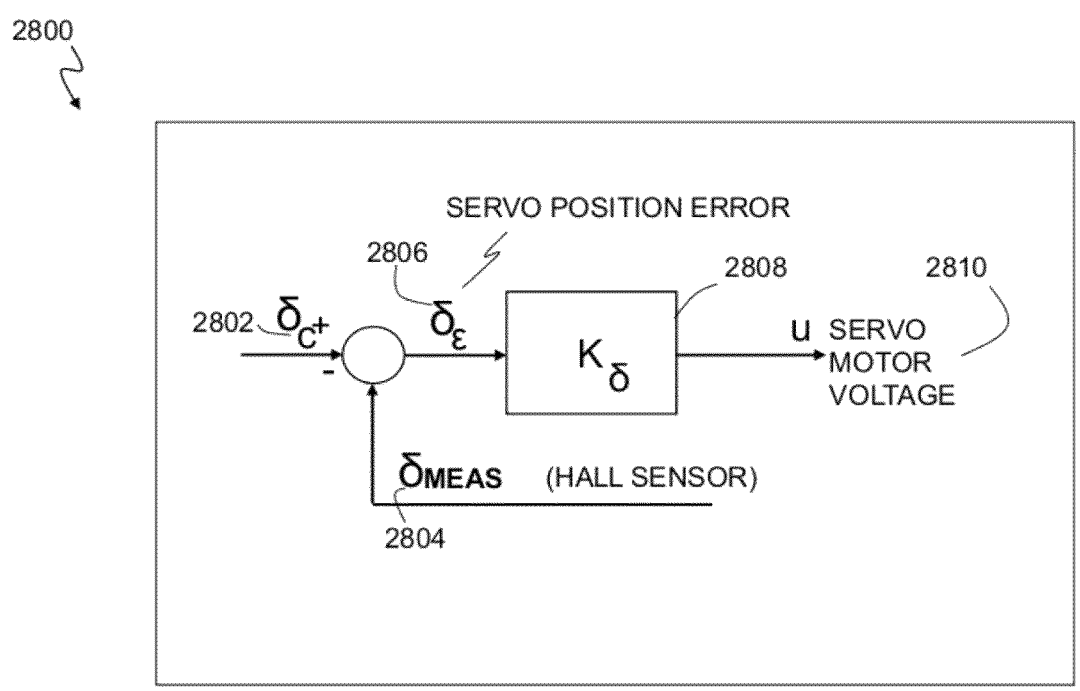
FIG. 28 is an exemplary top level block diagram of a servo controller.

FIG. 28 is an exemplary top level block diagram of a servo controller 2800 where a position command, $d_C$, 2802 is differenced from the measured position, $d_{MEAS}$, 2804 to generate a servo position error, $d_\epsilon$, 2806 and then the servo position error is multiplied by a servo gain $K_\delta$, 2808 to generate servo motor voltage command, u 2810. Per servo channel, the servo controller 2800, along with gains or steps to generate gains, may be expressed in machine-readable language, stored in memory accessible by the aircraft processor, and executed to servo motor voltage commands for one or more servos.

Figure 29:
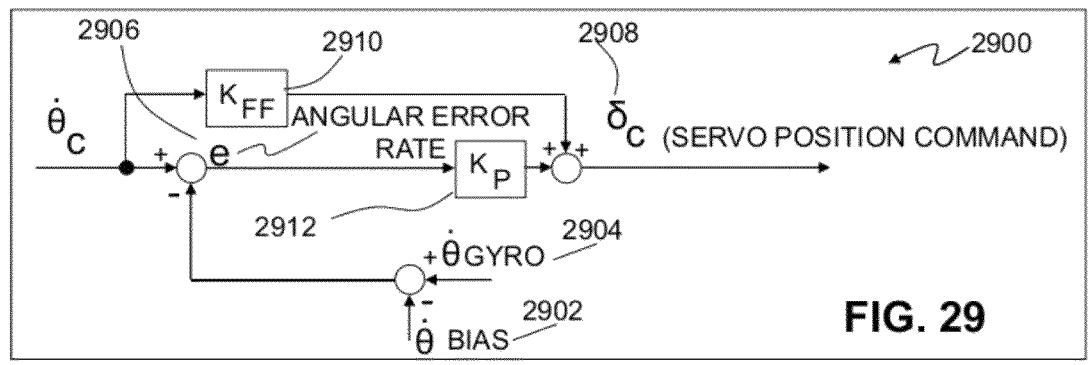
FIG. 29 is an exemplary top level block diagram of an angular rate controller.

FIG. 29 is an exemplary top level block diagram of an angular rate controller 2900 that may be implemented for roll, pitch, or yaw rate control. A biased angular rate 2902 measurement may be generated by differencing the filtered gyro rate 2904 measurement and a gyro rate bias based on one or more gyro readings stored at throttle-up, i.e., before the wings start flapping. An angular error rate, e, 2906 may be generated by differencing the angular rate command and the biased angular rate 2902 measurement. The servo position command, $\delta_C$, 2908 may be generated by combining the product of the angular rate command and a feed forward gain, $K_{FF}$, 2910 with the product of the angular error rate 2906 and a proportional rate gain, $K_P$ 2912.

Figure 30:
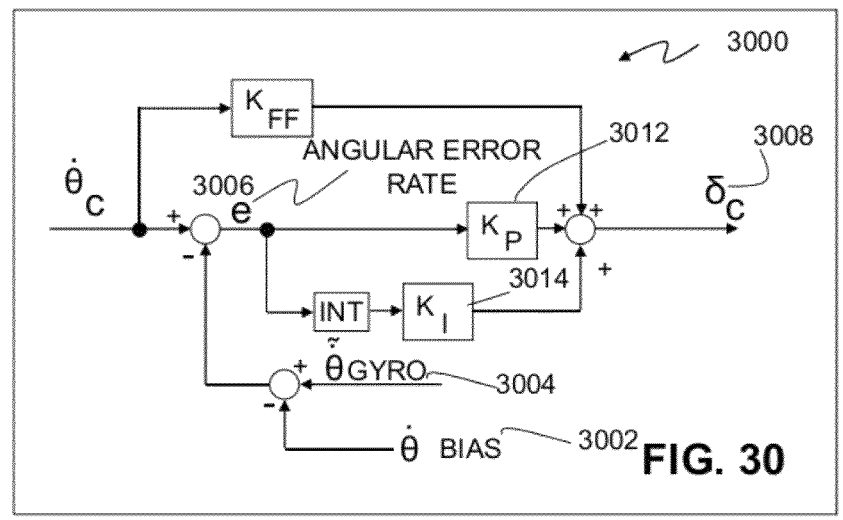
FIG. 30 is an exemplary top level block diagram of an angular rate controller.

FIG. 30 is an exemplary top level block diagram of an angular rate controller 3000 that may be implemented for roll, pitch, or yaw rate control. A biased angular rate measurement 3002 may be generated by differencing the filtered gyro rate measurement 3004 and a gyro rate bias based on one or more gyro readings stored at throttle-up, i.e., before the wings start flapping. A digital integrator may integrate over time the angular error rate, e, 3006. An angular error rate, e, 3006 may be generated by differencing the angular rate command and the biased angular rate measurement. The servo position command, $\delta_C$, 3008 may be generated by combining the product of the angular rate command and a feed forward gain, $K_{FF}$, 3010 with the product of the angular error rate and a proportional rate gain, $K_P$, 3012 and along with the product of the integrated angular error rate multiplied by a gain, $K_I$ 3014.

Figure 31:
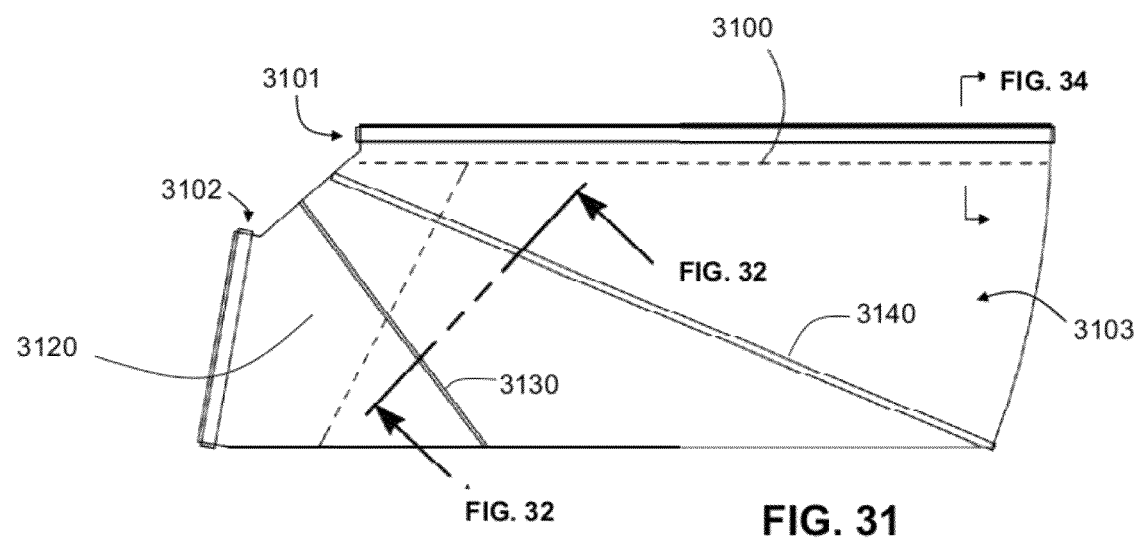
FIG. 31 depicts an exemplary wing.
Figure 32:
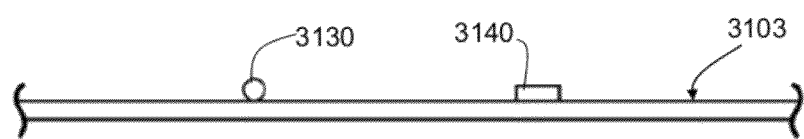
FIG. 32 depicts in cross sectional view the wing of FIG. 31.
Figure 33:
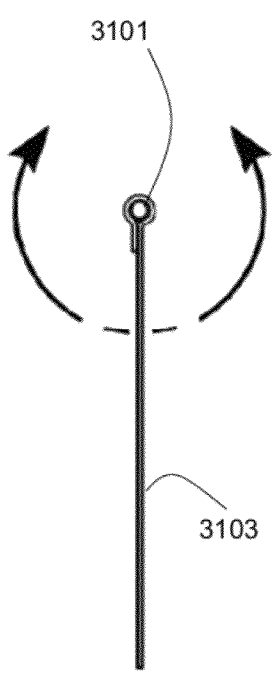
FIG. 33 depicts in an edge on view of FIG. 31 depicting rotatability of the membrane about the mast.
Figures 34, 35:
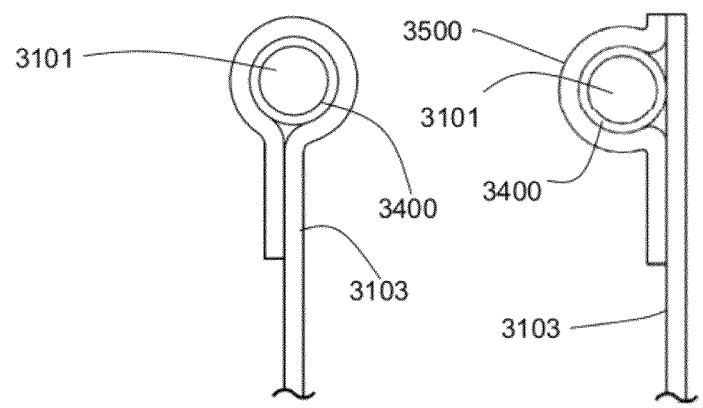
FIG. 34 depicts in a cross section view of wing FIG. 31 the membrane wrapped around a tube within which is disposed the mast, or root-to-wingtip spar.
FIG. 35 depicts another means of attachment where a separate piece of material is used to attach the tube to the membrane.
Figure 36:
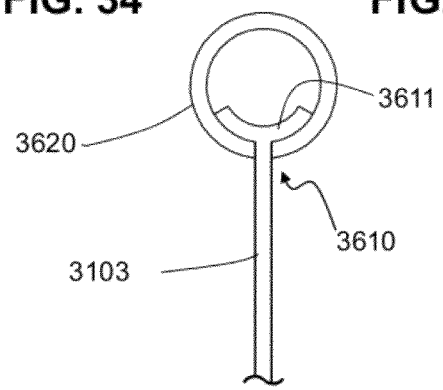
FIG. 36 depicts another means of attachment where the membrane edge has a t-shape portion when viewed edge on, and the t-shaped portion, or orthogonal edge surface, is inserted within the mast tube, and may be held in place by the mast element.
Figure 37:
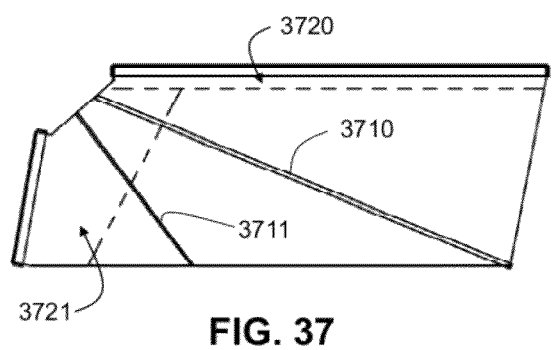
FIG. 37 depicts an exemplary airfoil having two battens and membrane fold-over portions.
Figure 38:
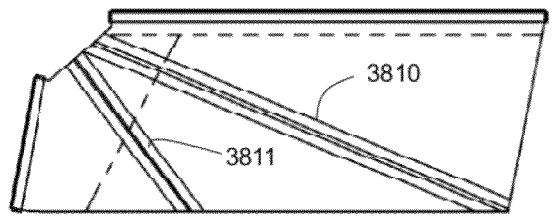
FIG. 38 depicts an exemplary airfoil having two battens, membrane fold-over portions, and where the battens have membrane overlays.
Figure 39:
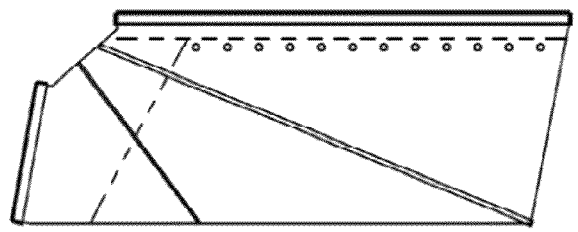
FIG. 39 depicts the airfoil of FIG. 37 where the membrane material is a foam membrane.
Figure 40:
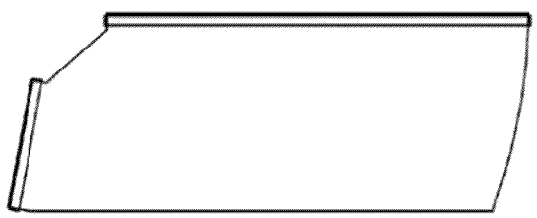
FIG. 40 depicts an airfoil without battens and no membrane fold-overs.
Figure 41:
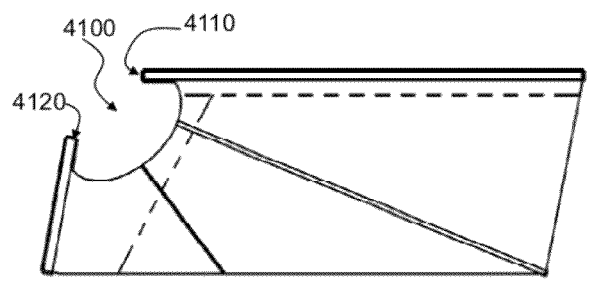
FIG. 41 depicts an airfoil having two battens, membrane fold-overs and an arcuate cutout region between the mast sleeve and the root spar sleeve.
Figure 42:
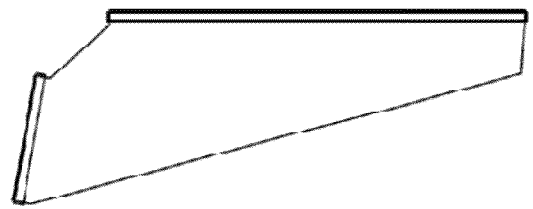
FIG. 42 depicts an angular airfoil of relatively reduced surface area.
Figure 43:
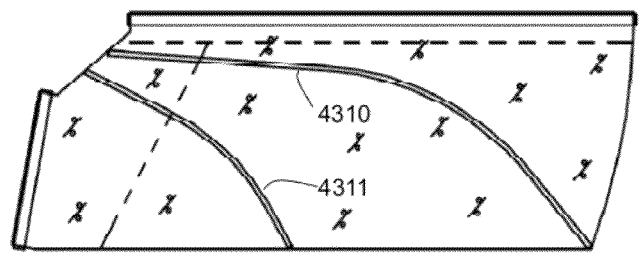
FIG. 43 depicts an airfoil made of a foam membrane having two curving battens, and membrane fold-overs.
Figure 44:
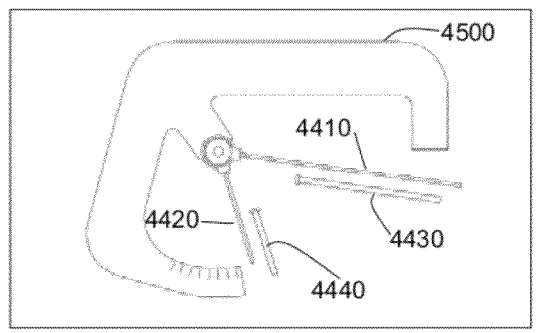
FIG. 44 depicts a fixture for making an airfoil.
Figure 45:
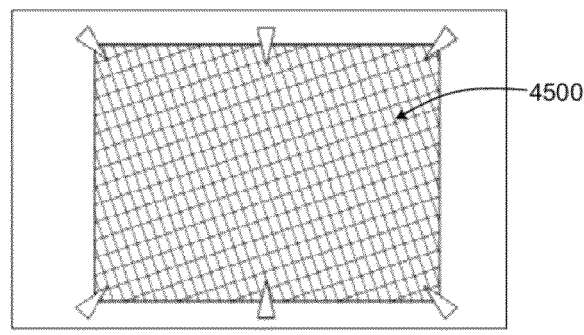
FIG. 45 depicts a membrane blank having a filament grid fixed to a working surface.
Figure 46:
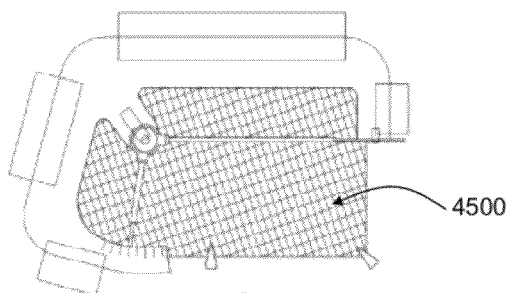
FIG. 46 depicts the fixture of FIG. 44 positioned over the membrane blank.
Figure 47:
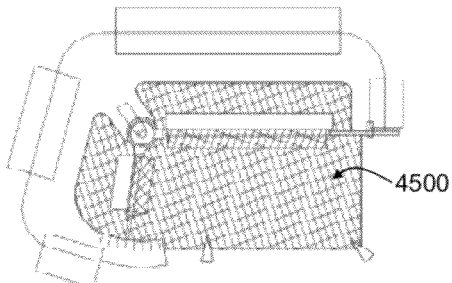
FIG. 47 depicts a cut and fold-over step along the mast and root spar.
Figure 50:
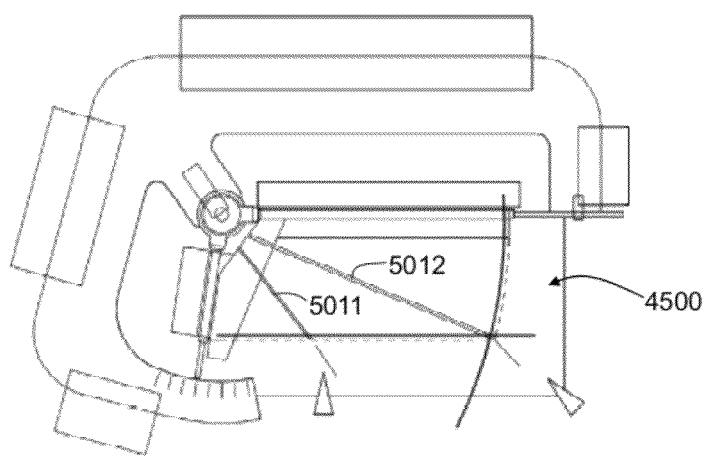
FIG. 50 depicts the battens applied to the surface of the membrane and a cut step for the remainder of the planform.
Figure 51:
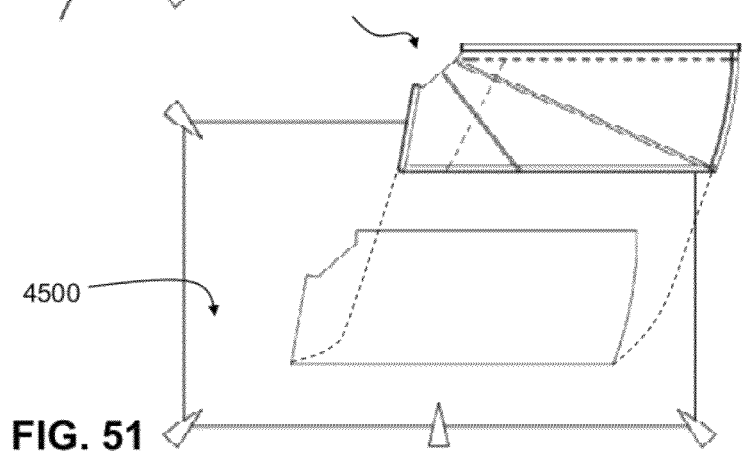
FIG. 51 depicts a removal of an exemplary airfoil from the blank.

FIG. 31 depicts an exemplary wing having mast, root spar and a membrane having a mast fold-over portion 3100 and a root spar fold-over portion 3120, and first batten 3130. FIG. 32 depicts in cross sectional view the wing of FIG. 31 where a first batten 3130 is a rod-shaped filament disposed on the membrane surface, the second batten 3140 is parallelepiped-shaped. FIG. 33 depicts in an edge on view of FIG. 31 depicting rotatability of the membrane about the mast. FIG. 34 depicts in a cross section view of wing FIG. 31 where the membrane 3103 wrapped around a 3400 tube within which is disposed the mast, or root-to-wingtip spar. The overlapping surfaces of the membrane may be joined in part by an epoxy or heat treatment. FIG. 35 depicts another means of attachment where a separate piece of material 3500, that may be the same material as the membrane, is used to attach the tube 3400 to the membrane 3103. FIG. 36 depicts another means of attachment where the membrane edge 3610 has a t-shape portion 3611 when viewed edge on, and the t-shaped portion, or orthogonal edge surface, is inserted within the mast tube 3620 along a slit, and may be held in place by pressure of the mast element of fixed via heat or epoxy. FIG. 37 depicts an exemplary airfoil having two battens a membrane fold-over portions. FIG. 38 depicts an exemplary airfoil having two battens and membrane fold-over portions, where the battens have membrane overlays, 3810, 3811. FIG. 39 depicts the airfoil of FIG. 37 having two battens 3710, 3711 and two fold-over regions 3720, 3721, and where the membrane material is a foam membrane. FIG. 40 depicts an airfoil without battens and no membrane fold-overs. FIG. 41 depicts an airfoil having two battens, membrane fold-overs and an arcuate cutout region 4100 between the mast 4110 and the root spar 4120. FIG. 42 depicts an angular airfoil planform of reduced surface area when compared with other examples, and without fold-over regions or battens. FIG. 43 depicts an airfoil made of a foam membrane having two curving battens 4310, 4311, and membrane fold-overs. FIG. 44 depicts a fixture 4400 for making an airfoil with the mast 4410 and root spar 4420 attached to the fixture 440, and the tubes 4430 and 4440 available. FIG. 45 depicts a membrane blank 4500 having a filament grid fixed to a working surface. FIG. 46 depicts the fixture of FIG. 44 positioned over the membrane blank. FIG. 47 depicts a cutting of the membrane and fold-over step along the mast and root spar. FIG. 48 depicts the battens 5011, 5012 applied to the surface of the membrane and a cut step for the remainder of the planform. FIG. 49 depicts a removal of an exemplary airfoil 5110 from the blank 4500.

One of ordinary skill in the art will appreciate that the elements, components, steps, and functions described herein may be further subdivided, combined, and/or varied, and yet, still remain within the spirit of the embodiments of the invention. Accordingly, it should be understood that various features and aspects of the disclosed embodiments may be combined with, or substituted for one another in order to form varying modes of the invention, as disclosed by example. It is intended that the scope of the present invention herein disclosed by examples should not be limited by the particular disclosed embodiments described above. Accordingly, the invention has been disclosed by way of example and not limitation, and reference should be made to the following claims to determine the scope of the present invention.

What is claimed is:

1. An air vehicle comprising:
a support structure comprising: a flapping drive element;
a first airfoil rotatably attached to the support structure; and
a second airfoil rotatably attached to the support structure;
wherein the first airfoil comprises a first root spar and a first membrane attached to the first root spar, the first airfoil configured to be driven to flap via the flapping drive element; and
wherein the second air foil comprises a second root spar and a second membrane attached to the second root spar, the second airfoil configured to be driven to flap via the flapping drive element;
wherein air vehicle control about at least one axis of the vehicle is effected by at least one of:
a variable membrane luffing; variable root spar rotation travel limitation; and variable flapping angular velocity of the flapping drive element; and
wherein the flapping drive element comprises:
a rotating element having a center of rotation and a plane of rotation;
a first capstan mounted about a shaft, the shaft attached to the rotating element distal from the center of rotation and substantially perpendicular to the plane of rotation;
a first rocker member rotatably attached to a support structure;
a first drive link rotatably attached to the first capstan and the first rocker member;
a first arm rotatably attached to the support structure and rotatably attached to the first rocker member via a first rocker link;
a second capstan mounted about the shaft;
a second rocker member rotatably attached to the support structure;
a second drive link rotatably attached to the second capstan and the second rocker member; and
a second arm rotatably attached to the support structure and rotatably attached to the second rocker member via a second rocker link.

2. The air vehicle of claim 1 wherein the rotating element is rotatably attached to the support structure.

3. An air vehicle comprising:
a support structure comprising: a flapping drive element;
a first airfoil rotatably attached to the support structure; and
a second airfoil rotatably attached to the support structure;
wherein the first airfoil comprises a first root spar and a first membrane attached to the first root spar, the first airfoil configured to be driven to flap via the flapping drive element; and
wherein the second air foil comprises a second root spar and a second membrane attached to the second root spar, the second airfoil configured to be driven to flap via the flapping drive element;
wherein air vehicle control about at least one axis of the vehicle is effected by at least one of:
a variable membrane luffing; variable root spar rotation travel limitation; and variable flapping angular velocity of the flapping drive element; and
wherein the flapping drive element comprises:
a rotating element having a center of rotation and a plane of rotation;
a first capstan mounted about a shaft, the shaft attached to the rotating element distal from the center of rotation and substantially perpendicular to the plane of rotation;

a second capstan mounted about the shaft;

a first arm mounted to a third capstan, a first linking member connecting the third capstan with the first capstan;

a second arm mounted to a fourth capstan, a second linking member connecting the fourth capstan with the second capstan; and a third linking member connecting the third capstan with the fourth capstan.

4. The air vehicle of claim 3 wherein the third capstan has a center of rotation, the fourth capstan has a center of rotation, and the center of rotation of the rotating element is collinear with the center of rotation of the third capstan and the center of rotation of the fourth capstan.

5. The air vehicle of claim 4 wherein the first linking member comprises a cord, the second linking member comprises a cord, and the third linking member comprises a cord.

6. An air vehicle comprising:

a support structure comprising: a flapping drive element;

a first airfoil rotatably attached to the support structure; and a second airfoil rotatably attached to the support structure;

wherein the first airfoil comprises a first root spar and a first membrane attached to the first root spar, the first airfoil configured to be driven to flap via the flapping drive element; and wherein the second air foil comprises a second root spar and a second membrane attached to the second root spar, the second airfoil configured to be driven to flap via the flapping drive element;

wherein air vehicle control about at least one axis of the vehicle is effected by at least one of: a variable membrane luffing; variable root spar rotation travel limitation; and variable flapping angular velocity of the flapping drive element; and wherein the flapping drive element comprises:

a first motor driving a first rotating element, the first rotating element having a center of rotation and a plane of rotation;

a first capstan mounted about a shaft, the shaft attached to the rotating element distal from the center of rotation and substantially perpendicular to the plane of rotation;

a second capstan mounted about the shaft;

a first arm mounted to a third capstan, a first linking member connecting the third capstan with the first capstan;

a second linking member connecting the fourth capstan with the second capstan; and a third linking member connecting the third capstan with the fourth capstan;

a second motor driving a second rotating element, the second rotating element having a center of rotation and a plane of rotation;

a fifth capstan mounted about a second shaft, the second shaft attached to the second rotating element distal from the center of rotation and substantially perpendicular to the plane of rotation of the second rotating element;

a sixth capstan mounted about the second shaft;

a fourth linking member connecting the seventh capstan with the fifth capstan;

a second arm mounted to a eighth capstan, a fifth linking member connecting the eighth capstan with the sixth capstan; and a sixth linking member connecting the seventh capstan with the eighth capstan;

and circuitry controlling a flapping rate of the first motor and the second motor.

\* \* \* \* \*

UNITED STATES PATENT AND TRADEMARK OFFICE
CERTIFICATE OF CORRECTION

PATENT NO.         : 8,210,471 B2                              Page 1 of 1
APPLICATION NO.    : 13/023772
DATED              : July 3, 2012
INVENTOR(S)        : Matthew Todd Keennon et al.

It is certified that error appears in the above-identified patent and that said Letters Patent is hereby corrected as shown below:

In the Specification

Column 2, lines 37, 40, 42, and 43, the word "yang", each occurrence, should read --vang--.

Column 7, lines 30, 41, and 42, the word "yang", each occurrence, should read --vang--.

Column 14, lines 58, 61, 63, and 64, the word "yang", each occurrence, should read --vang--.

Column 15, lines 41, 42, 48, 59, and 60, the word "yang", each occurrence, should read --vang--.

Signed and Sealed this
Fifteenth Day of April, 2014

Michelle K. Lee
*Deputy Director of the United States Patent and Trademark Office*